United States Patent
Yamashita

(10) Patent No.: US 7,583,708 B2
(45) Date of Patent: Sep. 1, 2009

(54) DATA TRANSMITTING APPARATUS AND DATA RECEIVING APPARATUS

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 771 days.

(21) Appl. No.: 11/104,056

(22) Filed: Apr. 12, 2005

(65) Prior Publication Data

US 2005/0281296 A1 Dec. 22, 2005

(30) Foreign Application Priority Data

Apr. 13, 2004 (JP) .............................. 2004-117851
Nov. 16, 2004 (JP) .............................. 2004-331355

(51) Int. Cl.
*H04J 3/04* (2006.01)

(52) U.S. Cl. .................................... 370/535

(58) Field of Classification Search ................ 370/366, 370/386, 387, 388, 535
See application file for complete search history.

(56) References Cited

U.S. PATENT DOCUMENTS

| | | | | |
|---|---|---|---|---|
| 5,233,603 A | * | 8/1993 | Takeuchi et al. ............ 370/412 |
| 5,331,671 A | * | 7/1994 | Urbansky ................... 375/371 |
| 6,054,944 A | * | 4/2000 | Yamashita ................... 341/95 |
| 6,151,334 A | * | 11/2000 | Kim et al. .................... 370/468 |
| 6,879,603 B1 | * | 4/2005 | Koenig et al. ............... 370/535 |
| 2001/0010037 A1 | * | 7/2001 | Imai et al. ................... 704/210 |
| 2002/0191721 A1 | * | 12/2002 | Tokuhiro .................... 375/354 |
| 2004/0028086 A1 | * | 2/2004 | Ghiasi et al. ................ 370/536 |

\* cited by examiner

*Primary Examiner*—Hanh Nguyen
*Assistant Examiner*—Juvena Loo
(74) *Attorney, Agent, or Firm*—Frommer Lawrence & Haug LLP; William S. Frommer; Thomas F. Presson

(57) ABSTRACT

A data transmitting apparatus and a data receiving apparatus, which multiplexes and transmits HD-SDI signals, and receives the multiplexed and transmitted HD-SDI signals, respectively. The data transmitting apparatus includes a parallel data forming section that forms word string data based on HD-SDI signals having n channels. A data multiplexing section obtains multiplex word string data based on the formed word string data. A multiple channel data forming section forms bit string data of m channels from the multiplex word string data. A data multiplexing and P/S converting section forms bit string data based on the formed bit string data, whereby a bit rate is set to 10 Gb/s or more. An electric photo converting section transmits the formed bit string data.

11 Claims, 17 Drawing Sheets

DATA TRANSMITTING APPARATUS AND DATA RECEIVING APPARATUS

CROSS REFERENCES TO RELATED APPLICATIONS

The present invention contains subject matters related to Japanese Patent Application JP 2004-117851 filed in the Japanese Patent Office on Apr. 13, 2004 and Japanese Patent Application JP 2004-331355 filed in the Japanese Patent Office on Nov. 16, 2004, the entire contents of which being incorporated herein by reference.

BACKGROUND OF THE INVENTION

1. Field of Invention

The invention relates to a data transmitting apparatus which transmits bit string data, which is used on the occasion of carrying out transmission of a serial digital video signal which forms bit string data having a bit rate implemented in relation to a standard, and a data receiving apparatus which receives bit string data transmitted from the data transmitting apparatus.

2. Description of Relevant Art

In the field of video signals, from a viewpoint of realizing diversification of information to be transmitted, high quality of reproduced images, etc., efforts of digitization have been made in a proactive manner, and digital video signals, which are formed by digital data representing video signal information, have been proposed with several different systems. For example, a 4:2:2 component digital video signal which is formed by digital data representing video signal information under a standard television system in which the number of lines in each frame is set to 525 lines (hereinafter, referred to as D1 signal), a digital video signal under a HDTV (High Definition Television) system in which the number of lines in each frame is set to 1125 lines (hereinafter, referred to as HD signal), etc. have been known.

The D1 signal is configured, for example, by such a process that word multiplexing processing is applied to Y data series which were made as 10 bit word string data representing a luminance signal component in a video signal, and $C_B/C_R$ data series which were made as 10 bit word string data representing color difference signal component in the video signal. In addition, the HD signal is formed as word string data which followed a predetermined data format, and there are a Y, $C_B/C_R$ type one which is composed of the Y data series and the $C_B/C_R$ data series, and a G, B, R type one which is composed of G data series, B data series and R data series which represent a green color original color signal component, a blue color original color signal component and a red color original color signal component in a video signal.

On the occasion that the suchlike digital video signal is transmitted through a signal transmission path which is configured by an optical signal transmission cable etc. formed by, for example, a coaxial cable and an optical fiber, a structure of the signal transmission path is simplified, and because of that, serial transmission becomes to be desired, in which transmission, a digital video signal is converted from word string data into bit string data (serial digital video signal) and then, transmitted. Then, as to serial transmission of the D1 signal and serial transmission of the HD signal, they are standardized by SMPTE (Society of Motion Picture and Television Engineers) in the United States, respectively, and as to the D1 signal, transmission, which was compliant with SDI (Serial Digital Interface) by SMPTE 259M which is a standard established by SMPTE, is carried out (see, SMPTE STANDARD SMPTE 259M-1997, for Television—10-Bit 4:2:2 Component and 4fsc Composite Digital Signals-Serial Digital Interface), and in addition, as to the HD signal, transmission, which was compliant with HD-SDI (High Definition-Serial Digital Interface) by SMPTE 292M which is a standard established by SMPTE, is carried out (see, SMPTE STANDARD SMPTE 292M-1998, for Television—Bit-Serial Digital Interface for High-Definition Television Systems).

In the transmission which was compliant with SDI, the standard defines that a data rate (bit rate) of a serial digital video signal, which is bit string data being transmitted through a signal transmission path formed by a coaxial cable, an optical transmission cable etc., is set to, for example, 270 Mb/s. That is, on the occasion of transmission of a serial digital video signal to be used for the transmission which was compliant with SDI (hereinafter, referred to as SD signal), a bit rate of the SD signal is to be set to for example, 270 Mb/s. On one hand, on the occasion of the transmission which was compliant with HD-SDI, the standard defines that a bit rate of a serial digital video signal, which is transmitted through a signal transmission path formed by a coaxial cable, an optical signal transmission cable etc., is to be set to 1.485 Gb/s or 1.485/1.001 Gb/s (in this application, both of these bit rates are referred to as 1.485 Gb/s). That is, on the occasion of transmission of a serial digital video signal to be used for the transmission which was compliant with HD-SDI (hereinafter, referred to as HD-SDI signal), a bit rate of the HD-SDI signal is to be set to 1.485 Gb/s.

As to the HD-SDI signal among the SD signal and the HD-SDI signal which are the suchlike serial digital signals, an HD signal, which becomes its basis, is limited to one having a predetermined data format (hereinafter, referred to as source format). A source format, which the suchlike limited HD signal has, is to be defined by parameters of for example, a frame rate: 24 Hz or 24/1.001 Hz (in this application, both of them are referred to as 24 Hz), 25 Hz or 30 Hz or 30/1.001 Hz (in this application, both of them are referred to as 30 Hz), effective line number in each frame: 1080 lines (total line number in each frame: 1125 lines), effective word number in each line: 1920 words, word bit number (quantifying bit number): 10 bits, data format: Y, $C_B/C_R$ format, and so on.

Under the suchlike situation, as to digital video signals, with the aim of further improvement of resolution of an image which is reproduced on the basis of it, further pursuit of image quality improvement etc., as to parameters which define its data format, it has been proposed to set a frame rate to 60 Hz or 60/1.001 Hz (in this application, both of them are referred to as 60 Hz) or 90 Hz or 90/1.001 Hz (in this application, both of them are referred to as 90 Hz), to make the effective line number in each frame and the effective word number in each line larger than 1080 lines and 1920 words, e.g., approximately twice of 1080 lines and 1920 words, without limited them to 1080 lines and 1920 words, to set the word bit number to bit number which exceeds 10 bits, for example, 12 bits, 14 bits etc., and further, to set a data format to the G, B, R format, and so on. As examples of digital video signals which followed the such proposals, there are one which data format is defined by parameters of for example, frame rate: 60 Hz, effective line number in each frame: 1080 lines, effective word number in each line: 1920 words, word bit number: 12 bit, data format: G, B, R format, etc. (hereinafter, referred to as next generation camera signal), one which data format is defined by parameters of for example, frame rate: 90 Hz, effective line number in each frame: 1080 lines, effective word number in each line: 1920 words, word bit number: 14 bit, data format: G, B, R format, etc. (hereinafter, referred to as HD super motion signal), and furthermore, one which data format is defined by parameters of for example, frame rate: 24 Hz, effective line number in each frame: 2160 lines, effective word number in each line: 4096 words, word bit number: 12 bit, data format: G, B, R format, etc. (hereinafter, referred to as 4 k×2 k signal), and so on.

Also as to each of these next generation camera signal, HD super motion signal, 4 k×2 k signal etc., on the occasion of its transmission, serial transmission becomes to be desired, in which transmission, a digital video signal is converted from a parallel digital signal forming word string data into a serial digital video signal forming bit string data and then, transmitted.

SUMMARY OF THE INVENTION

As described above, on the occasion of transmission of the HD-SDI signal in which a bit rate is set to 1.485 Gb/s defined by a standard, there are quite a lot of cases in which it is desired to transmit HD-SDI signals of multiple channels having information contents which are different from one another, at the same time. On that occasion, in order to realize the efficiency of transmission, it is conceivable to transmit and receive HD-SDI signals of multiple channels, as one in which multiplexing processing as to them was carried out, through a common signal transmission path. However, in the past, there is also a problem of frequency band boundary of an actual signal processing circuit system, and therefore, a transmission system, which used a signal processing method enabling to realize transmission and reception under such a state that multiplexing processing as to HD-SDI signals of multiple channels was carried out, has not yet been put to practical use. In addition, a signal processing method which enables to transmit and receive HD-SDI signals of multiple channels under such a state that multiplexing processing as to them was carried put, and furthermore, a document etc., which described as to a transmission system which used it, have not yet been found.

In addition, each of the above-described next generation camera signal, HD super motion signal, 4 k×2 k signal etc. is one which belongs to a so-called ultra wide band video signal, and then, it is tried to carry out serial transmission which is desired as descried above, in accordance with a past transmission engineering method, it becomes to require signal processing covering an extremely wide frequency band, as compared with a case of serial transmission as to HD-SDI signals. Therefore, in the past, an actual transmission system which can be available for practical use as to each of the above-described next generation camera signal, HD super motion signal, 4 k×2 k signal etc. and which can carry out serial transmission, or, a document etc. which described as to such a transmission system, have not yet been found Furthermore, as described above, also on the occasion of transmission of the SD signal in which a bit rate is set to 270 Mb/s defined by a standard, there are also quite a lot of cases in which it is desired to transmit SD signals of multiple channels having information contents which are different from one another, at the same time, or to mix SD signals and HD-SDI signals of multiple channels to transmit them at the same time. On that occasion, it is conceivable to transmit and receive SD signals of multiple channels, or SD signals and HD-SDI signals of multiple channels, as one in which multiplexing processing as to them was carried out, through a common signal transmission path. However, in the past, there is also a problem of frequency band boundary of an actual signal processing circuit system, and therefore, a transmission system, which realized serial transmission under such a state that multiplexing processing as to SD signals of multiple channels, or SD signals and HD-SDI signals of multiple channels was carried out, as one which is available for practical use, or a document etc., which described as to such a transmission system, have not yet been found.

In view of such points, an invention according to an embodiment of the invention provides a data transmitting apparatus and a data receiving apparatus which can effectively carry out serial transmission of HD-SDI signals of multiple channels, in which it becomes possible to transmit and receive HD-SDI signals having standardized bit rate under such a state that multiplexing processing as to the multiple channels was carried out, and in addition, can realize serial transmission as to each of the next generation camera signal, HD super motion signal, 4 k×2 k signal etc., as a form which is available for practical use, and further, can realize serial transmission of SD signals of multiple channels, or SD signals and HD-SDI signals of multiple channels, under such a state that multiplexing processing as to them was carried out, as a form which is available for practical use.

A data transmitting apparatus according to an embodiment of the invention is configured to include a plurality of serial/parallel converting (S/P converting) means to which first serial digital video signals of n channels (n is an integer of 2 or more, same in what follows) forming bit string data, each of which has a bit rate defined by a standard, are supplied, to obtain first word string data of n channels forming a parallel digital video signal, each of which has a line portion data structure defined by a standard, a plurality of 8 bit/10 bit converting (8B/10B converting) means to which the first word string data of n channels, which is obtained from the plurality of S/P converting means, is supplied, to apply 8B/10B converting processing to each of the first word string data of n channels by a first predetermined bit number at a time, and to form second work string data of n channels, each of which has a predetermined word bit number, data multiplexing means which multiplexes the second word string data of n channels which is obtained from the plurality of 8B/10B converting means, to form multiplex word string data, multiple channel data forming means which takes out the multiplex word string data which is obtained from the data multiplexing means, by a second predetermined bit number at a time, to form bit string data of m channels (m is an integer which is larger than n, same in what follows), each of which has a predetermine bit rate, data multiplexing and P/S converting means which multiplexes bit string data of m channels, which is obtained from the multiple channel data forming means and also applies parallel/serial conversion (P/S conversion) thereto, to form bit string data in which a data rate is 10 Gb/s or more, as a second serial/digital video signal, and data sending away means which sends away to transmit bit string data which is obtained from the data multiplexing and parallel/serial converting means and in which a data rate is 10 Gb/s or more.

In particular, a data transmitting apparatus according to an embodiment of the invention is configured to include multiple channel serial digital video signal forming means to which a specific parallel digital video signal, which forms word string data configured with a specific frame rate, a quantifying bit number, and parallel arrangement of green color, blue color and red color original color signal data series, is supplied, to convert the specific parallel digital video signal into first serial digital video signals of n channels forming bit string data, each of which has a bit rate defined by a standard, and the first serial digital video signals of n channels, which are obtained from the multiple channel serial digital video signal forming means, are supplied to the plurality of S/P converting means.

In addition, a data transmitting apparatus according to an embodiment of the invention is configured to include n pieces of serial digital video signal forming means, to which third serial digital video signals of p channels (p is an integer of 2 or more, same in what follows) forming bit string data, each of which has a lower bit rate defined by a standard than a bit rate of the first serial digital video signal, are supplied, to form a first serial digital video signal of 1 channel based on the third serial digital signals of p channels, and the first serial digital video signals of n channels, which are obtained from the n pieces of serial digital video signal forming means, respectively, are supplied to the plurality of S/P converting means.

Further, a data transmitting apparatus according to an embodiment of the invention is configured to include q pieces (q is an integer which is smaller than n, same in what follows) of serial digital video signal forming means to which third serial digital video signals of p channels (p is an integer of 2 or more) forming bit string data, each of which has a lower bit rate defined by a standard than a bit rate of the first serial digital video signal, to form a first serial digital video signal of 1 channel based on the third serial digital video signals of p channels, and the first serial digital video signals of q channels, which are obtained from the q pieces of serial digital video forming means, respectively, and the first serial digital video signals of (n−q) channels are supplied to the plurality of S/P converting means as first serial digital video signals of n channels.

On one hand, a data receiving apparatus according to an embodiment of the invention is configured to include data receiving means which receives bit string data in which a bit rate is 10 Gb/s or more, as a first serial digital video signal, S/P converting and multiple channel data forming means which applies S/P conversion to bit string data which is obtained from the data receiving means and in which a bit rate is 10 Gb/s or more, to form bit string data of m channels, each of which had a predetermined bit rate, data multiplexing means which multiplexes bit string data of m channels which is obtained from the S/P converting and multiple channel data forming means, to form multiplex word string data, data separating means which takes out the multiplex word string data which is obtained from the data multiplexing means, by a first predetermined bit number at a time, to obtain first word string data of n channel, each of which has a predetermined word bit number, a plurality of 8B/10B decoding converting means to which first word string data of n channel, which is obtained from the data separating means, is supplied, to apply 10B/8B converting processing (8B/10B decoding converting) to each of the first word string data of n channels by a second predetermined bit number at a time, and to form second word string data of n channels, each of which is made as a parallel digital video signal having a line portion data structure defined by a standard, and a plurality of P/S converting means to which second word string data of n channels, which is obtained from the plurality of 8B/10B decoding converting means, is supplied, to obtain second serial digital video signals of n channels forming bit string data, each of which has a bit rate defined by a standard.

In particular, a data receiving apparatus according to an embodiment of the invention is configured to include specific parallel digital video signal forming means to which second serial digital video signals of n channels, forming bit string data which is obtained from the plurality of P/S converting means and having bit string data each of which has a bit rate defined by a standard, are supplied, to convert the second serial digital video signals of n channels into a specific parallel digital video signal, which forms word string data configured with a specific frame rate, a quantifying bit number, and parallel arrangement of green color, blue color and red color original color signal data series, and to send it out.

In addition, a data receiving apparatus according to an embodiment of the invention is configured to include n pieces of parallel digital video signal forming means to which second serial digital video signals of n channels, forming bit string data which is obtained from the plurality of P/S converting means and each of which has a bit rate defined by a standard, are supplied, respectively, and each of which converts one of the second serial digital video signals of n channels into third serial digital video signals of p channels forming bit string data which had a lower bit rate defined by a standard than a bit rate of the second serial digital video signal, and sends it out.

Further, a data receiving apparatus according to an embodiment of the invention is configured to include q pieces of parallel digital video signal forming means to which q pieces out of second serial digital video signals of n channels forming bit string data which is obtained from the plurality of P/S converting means and each of which has a bit rate defined by a standard, are supplied, respectively, and each of which converts one of the second serial digital video signals of n channels into third serial digital video signals of p channels forming bit string data which had a lower bit rate defined by a standard than a bit rate of the second serial digital video signal, and sends it out.

In a data transmitting apparatus according to an embodiment of the invention, first serial digital video signals of n channels, forming bit string data which are, for example, HD-SDI signals of 5 channels, each of which has a bit rate defined by a standard, for example a bit rate of 1.485 Gb/s, are converted into first ward string data of n channels forming parallel digital video signals, each of which has a line portion data structure defined by a standard, after S/P conversion is applied to each of them by a plurality of S/P converting means. Then, 8B/10B converting is applied to each of the first word string data of n channels, by a first predetermined bit number at a time, for example, by 40 bits at a time, to form second word string data of n channels, each of which was made to have a predetermined word bit number, for example, a word bit number of 50 bits, and after that, second word string data of n-channels is multiplexed, to form multiplex word string data. Subsequently, the multiplex word string data is taken out by a second predetermined bit number at a time, for example, by 250 bits at a time, to form bit string data of m channel, for example of 16 channel, each of which was made to have a predetermined bit rate, for example a bit rate of 668.25 Mb/s, and further, the bit string data of these m channels is multiplexed and also P/S converted, and bit string data in which a bit rate is 10 Gb/s or more, for example 10.692 Gb/s is formed as a second serial digital video signal. Then, this bit string data in which a bit rate is 10 Gb/s or more, for example 10.692 Gb/s is sent away so as to be transmitted.

In particular, in a data transmitting apparatus according to an embodiment of the invention, specific parallel digital video signals, which are to be, for example, next generation camera signals, HD super motion signals or 4 k×2 k signals and which form word string data configured with a specific frame rate, a quantifying bit number, and parallel arrangement of green color, blue color and red color original color signal data series, is converted by multiple channel serial digital video signal forming means into first serial digital video signals of n channels forming bit string data which is, for example, HD-SDI signals of n channels and each of which has a bit rate defined by a standard, and they are supplied to a plurality of S/P converting means. Then, the first serial digital video signals of n channels, which were supplied to the plurality of S/P converting means, are converted into second serial digital video signals forming bit string data in which a bit rate is 10 Gb/s or more, for example, 10.692 Gb/s, and sent away so as to be transmitted.

In addition, in a data transmitting apparatus according to an embodiment of the invention, third serial digital video signals of p channels, forming bit string data, each of which has a lower bit rate defined by a standard than a bit rate of the first serial digital video signals which are, for example, SD signals of 4 channels, are supplied to each of n pieces, which are, for example, 5 pieces, of serial digital video signal forming means. In each of these n pieces, which are, for example, 5 pieces, of serial digital video forming means, formed is a first serial digital video signal of 1 channel based on third serial digital signals of p channels which are, for example, SD signals of 4 channels. As a result of that, the first serial digital video signals of n channels, for example, 5 channels, which are obtained from the n pieces of serial digital video signal forming means, are supplied to a plurality of S/P converting means. Then, the first serial digital video signals of n channels, which were supplied to the plurality of S/P converting means, are converted into second serial digital video signals forming bit string data in which a bit rate is 10 Gb/s or more, for example, 10.692 Gb/s. and sent away so as to be transmitted.

Further, in a data transmitting apparatus according to an embodiment of the invention, third serial digital video signals of p channels forming bit string data, each of which has a lower bit rate defined by a standard than a bit rate of the first serial digital video signals which are, for example, SD signals of 4 channels, are supplied to each of q pieces, which are, for example, 4 pieces or less, of serial digital video forming means. In each of these q pieces, which are, for example, 4 pieces or less, of serial digital video signal forming means, formed is a first serial digital video signal of 1 channel based on third serial digital video signals of p channels, which are, for example, SD signals of 4 channels. As a result of that, first serial digital video signals of q channels, for example, 4 channels or less, which are obtained from the q pieces of serial digital video forming means, and first serial digital video signals of (n−q) channels, for example, 1 channel or more, are supplied to a plurality of S/P converting means as first serial digital video signals of n channels in total. Then, the first serial digital video signals of n channels, which were supplied to the plurality of S/P converting means, are converted into second serial digital video signals forming bit string data in which a bit rate is 10 Gb/s or more, for example, 10.692 Gb/s, and sent away so as to be transmitted.

On one hand, in a data receiving apparatus according to an embodiment of the invention, bit string data in which a bit rate is 10 Gb/s or more, for example, 10.692 Gb/s, is received as a first serial digital video signal, and S/P conversion is applied to that bit string data in which a bit rate is 10 Gb/s or more, for example, 10.692 Gb/s, to form bit string data of m channels, each of which has a predetermined bit rate, for example, a bit rate of 668.25 Mb/s, and after that, bit string data of m channels is multiplexed to form multiplex word string data. Then, the multiplex word string data is taken out by a first predetermined bit number at a time, for example, by 250 bits at a time, to form first word string data of n channel, for example of 5 channel, each of which has a predetermined word bit number, for example, a word bit number of 50 bits. Then, 8B/10B decoding conversion is applied to each of the first word string data of 5 channels, by a second predetermined bit number at a time, for example, by 50 bits at a time, to form second word string data of n channels, which is used as parallel digital video signals, each of which has a line portion data structure defined by a standard. Subsequently, the second word string data of n channels is P/S converted by a plurality of P/S converting means, respectively, and by that means, obtained are second serial digital video signals of n channels forming bit string data which is, for example, HD-SDI signals of 5 channels, each of which was made to have a bit rate defined by a standard, for example, a bit rate of 1.485 Gb·s.

In particular, in a data receiving apparatus according to an embodiment of the invention, second serial digital video signals of n channels, which are obtained from a plurality of P/S converting means, are converted by a specific parallel digital video forming means into specific parallel digital video signals which are to be, for example, next generation camera signals, HD super motion signals or 4 k×2 k signals and which form word string data configured with a specific frame rate, a quantifying bit number, and parallel arrangement of green color, blue color and red color original color signal data series, and drawn on.

In addition, in a data receiving apparatus according to an embodiment of the invention, each of second serial digital video signals of n channels, which are obtained from a plurality of P/S converting means, is converted by each of n pieces of parallel digital video signal forming means into third serial digital video signals of p channels forming bit string data which are, for example, SD signals of 4 channels, and each of which has a lower bit rate defined by a standard than a bit rate of the second serial digital video signal, and sent away as third serial digital video signals of n×p channels.

Further, in a data receiving apparatus according to an embodiment of the invention, each of q pieces, which are, for example, 4 pieces or less, out of second serial digital video signals of n channels which are obtained from a plurality of P/S converting means, is converted by each of q pieces of parallel digital video signal forming means into third serial digital video signals of p channels forming bit string data which is for example, SD signals of 4 channels and each of which has a lower bit rate defined by a standard than a bit rate of the second serial digital video signal, and sent away as third serial digital video signals of q×p channels, and (n−q) pieces, which are, for example, 1 piece or more, out of the second serial digital video signals of n channels which are obtained from the plurality of P/S converting means, are sent away together with third serial digital video signals of q×p channels.

According to a data transmitting apparatus described in an embodiment of the invention, multiplexing processing is applied to HD-SDI signals of n channels, for example, 5 channels as first serial digital video signals of n channels forming bit string data each of which has a bit rate defined by a standard, and after that, it can be converted into second serial digital video signals forming bit string data in which a bit rate is 10 Gb/s or more, for example, 10.692 Gb/s, and sent away so as to transmit it. Therefore, it becomes possible to effectively carry out serial transmission as to HD-SDI signals which are made to have a standardized bit rate which is 1.485 Gb/s under such a state that multiplexing processing was applied to these multiple channels.

Then, according to a data transmitting apparatus described in an embodiment of the invention, next generation camera signals, HD super motion signals or 4 k×2 k signals are converted into first serial digital video signals of n channels forming bit string data which is, for example, HD-SDI signals of n channels, and each of which has a bit rate defined by a standard, as specific parallel digital video signals forming word string data which was configured with a specific frame rate, a quantifying bit number, and parallel arrangement of green color, blue color and red color original color signal data series, and further, after multiplexing processing was applied to them, they can be converted into second serial digital video signals forming bit string data in which a bit rate is 10 Gb/s or more, for example, 10.692 Gb/s, and sent away so as to transmit it. Therefore, it becomes possible to realize serial transmission as to each of next generation camera signals, HD super motion signals, 4 K×2 k signals etc., in the form which is available for practical use.

In addition, according to a data transmitting apparatus described in an embodiment of the invention, SD signals of p×n channels, for example, 20 channels, are divided into n groups which are, for example, 5 groups, by n channels at a time, for example, by 4 channels at a time, and n groups of SD signals with p channels for each are supplied to each of n pieces of serial digital video signal forming means, to obtain, for example, HD-SDI signals based on SD signals of p channels from each serial digital video signal forming means, and thereby, SD signals of p×n channels are converted into first serial digital video signals of n channels, which are HD-SDI signals of n channels, and further, after multiplexing processing was applied to them, they can be converted into second serial digital video signals forming bit string data in which a bit rate is 10 Gb/s or more, for example, 10.692 Gb/s, and sent away so as to transmit it. Therefore, it becomes possible to realize serial transmission under such a state that multiplexing processing as to SD signals of multiple channels was carried out, as one which is available for practical use.

Further, according to a data transmitting apparatus described in an embodiment of the invention, SD signals of p×q channels, for example, 16 channels, are divided into q groups, for example, 4 groups or less, by p channels at a time, for example, by 4 channels at a time, and q groups of SD signals with p channels for each are supplied to each of q pieces of serial digital video signal forming means, to obtain, for example, HD-SDI signals based on SD signals of p channels from each serial digital video signal forming means, and thereby, SD signals of p×q channels are converted into first serial digital video signals of q channels, which are HD-SDI signals of q channels, and further, after multiplexing processing was applied to them together with separately prepared HD-SDI signals of (n−q) channels, for example, 1 channel or more, they can be converted into second serial digital video signals forming bit string data in which a bit rate is 10 Gb/s or more, for example, 10.692 Gb/s, and sent away so as to transmit it. Therefore, it becomes possible to realize serial transmission under such a state that multiplexing processing as to SD signals and HD-SDI signals of multiple channels was carried out, as one which is available for practical use.

On one hand, according to a data receiving apparatus described in an embodiment of the invention, bit string data, in which a bit rate is 10 Gb/s or more, for example, 10.692 Gb/s, is received as first serial digital video signals, and in case that the bit string data, in which a bit rate is 10 Gb/s or more, for example, 10.692 Gb/s, was formed after multiplexing processing, as to first serial digital video signals of n channels forming bit string data each of which has a bit rate defined by a standard, was carried out, it is possible to reproduce second serial digital video signals of n channels, forming bit string data which is, for example, HD-SDI signals of n channels, for example, 5 channels and each of which has a bit rate defined by a standard, from the received bit string data in which a bit rate is 10 Gb/s or more, for example, 10.692 Gb/s. Therefore, on the occasion of serial transfer as to HD-SDI signals having a standardized bit rate, for example, 1.485 Gb/s under such a state that multiple channels thereof were multiplexed, it becomes possible to configure that receiving apparatus.

Then, according to a data receiving apparatus described an embodiment of the invention, bit string data, in which a bit rate is 10 Gb/s or more, for example, 10.692 Gb/s, is received as first serial digital video signals, and in case that the bit string data, in which a bit rate is 10 Gb/s or more, for example, 10.692 Gb/s, was formed on the basis of specific parallel digital video signals forming word string data which was configured with a specific frame rate, a quantifying bit number, and parallel arrangement of green color, blue color and red color original color signal data series, it is possible to reproduce specific parallel digital video signals which are to be any one of, for example, next generation camera signals, HD super motion signals, 4 k×2 k signals etc. and which form word string data configured with a specific frame rate, a quantifying bit number, and parallel arrangement of green color, blue color and red color original color signal data series, from the received bit string data in which a bit rate is 10 Gb/s or more, for example, 10.692 Gb/s. Therefore, on the occasion of serial transfer as to any one of next generation camera signals, HD super motion signals, 4 k×2 k signals etc., it becomes possible to configure that receiving apparatus.

In addition, according to a data receiving apparatus described in an embodiment of the invention, bit string data, in which a bit rate is 10 Gb/s or more, for example, 10.692 Gb/s, is received as first serial digital video signals, and in case that the bit string data, in which a bit rate is 10 Gb/s or more, for example, 10.692 Gb/s, was formed on the basis of third serial digital video signals of n×p channels forming bit string data each of which has a lower bit rate defined by a standard than a bit rate of second serial digital video signals, it is possible to reproduce third serial digital video signals of n×p channels, forming bit string data which is, for example, SD signals of 20 channels and each of which has a lower bit rate defined by a standard than a bit rate of the second serial digital video signals, from the received bit string data in which a bit rate is 10 Gb/s or more, for example, 10.692 Gb/s. Therefore, on the occasion of serial transfer as to SD signals of multiple channels under such a state that they were multiplexed, it becomes possible to configure that receiving apparatus.

Further, according to a data receiving apparatus described in an embodiment of the invention, bit string data, in which a bit rate is 10 Gb/s or more, for example, 10.692 Gb/s, is received as first serial digital video signals, and in case that the bit string data, in which a bit rate is 10 Gb/s or more, for example, 10.692 Gb/s, was formed on the basis of third serial digital video signals of q×p channels and second serial digital video signals of (n−q) channels forming bit string data each of which has a lower bit rate defined by a standard than a bit rate of second serial digital video signals, it is possible to reproduce third serial digital video signals of q×p channels and second serial digital video signals of (n−q) channels, forming bit string data which is, for example, SD signals of 16 channels or less and HD-SDI signals of 1 channel or more, and each of which has a lower bit rate defined by a standard than a bit rate of the second serial digital video signals, from the received bit string data in which a bit rate is 10 Gb/s or more, for example, 10.692 Gb/s. Therefore, on the occasion of serial transfer as to SD signals and HD-SDI signals of multiple channels under such a state that they were mixed and multiplexed, it becomes possible to configure that receiving apparatus.

BRIEF DESCRIPTION OF THE DRAWINGS

The invention, together with further advantages thereof, may best be under stood by reference to the following description taken in conjunction with the accompanying drawings in which.

DETAILED DESCRIPTION OF THE EMBODIMENTS

Best modes for carrying out the invention will be explained with embodiments which will be described below.

Embodiment 1

Figure 1:
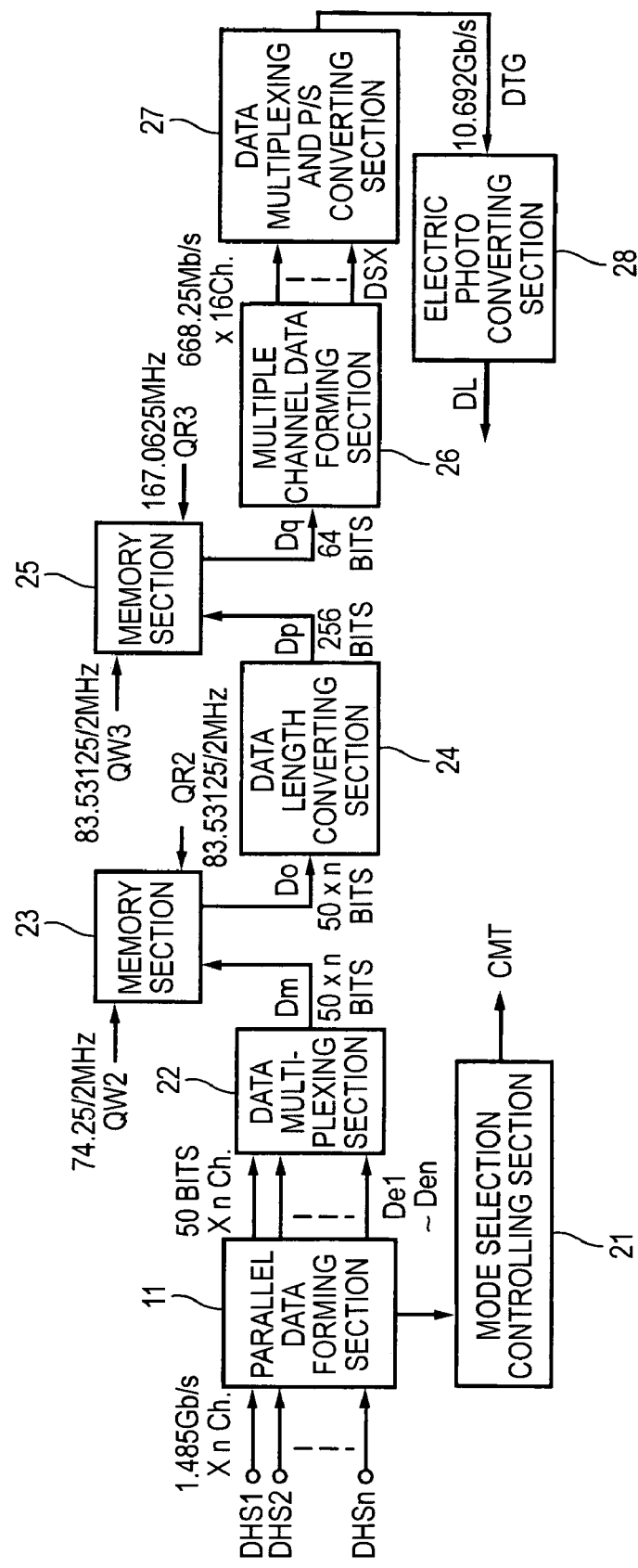
FIG. 1 is a block diagram which shows one example of a data transmitting apparatus described in an embodiment of the invention.

FIG. 1 shows one example (embodiment 1) of a data transmitting apparatus of the invention.

In the example shown in FIG. 1, i.e., in the embodiment 1, HD-SDI signals of n channels, DHS1, DHS2, . . . , DHSn, in each of which a bit rate is standardized 1.485 Gb/s, are supplied to a parallel data forming section 11, as serial digital video signals of n channels forming bit string data each of which has a bit rate defined by a standard. Each of the HD-SDI signals of n channels, DHS1, DHS2, . . . , DHSn, in each of which a bit rate is standardized 1.485 Gb/s, are to be obtained as a result of serialization of HD signals in which, for example, a frame rate is set to 30 Hz, 25 Hz or 24 Hz, and an effective line number in each frame and an effective word number in each line are set to 1080 lines and 1920 words, and a word bit number (quantifying bit number) is set to 10 bits, and a data format is set to a Y, $C_B/C_R$ format. Then, the n channels are set to, for example, 5 channels or 6 channels, and an operation mode 1 is to be of such a state that HD-SDI signals of 5 channels DHS1 to DHS5 are supplied to the parallel data forming section 11, and an operation mode 2 is to be of such a state that HD-SDI signals of 6 channels, DHS1 to DHS6 are supplied to the parallel data forming section 11.

The parallel data forming section 11 incorporates a data processing section PD1 to the HD-SDI signal DHS1, a data processing section PD2 to the HD-SDI signal DHS2, . . . , a data processing section PDn to the HD-SDI signal DHSn.

Figure 3:
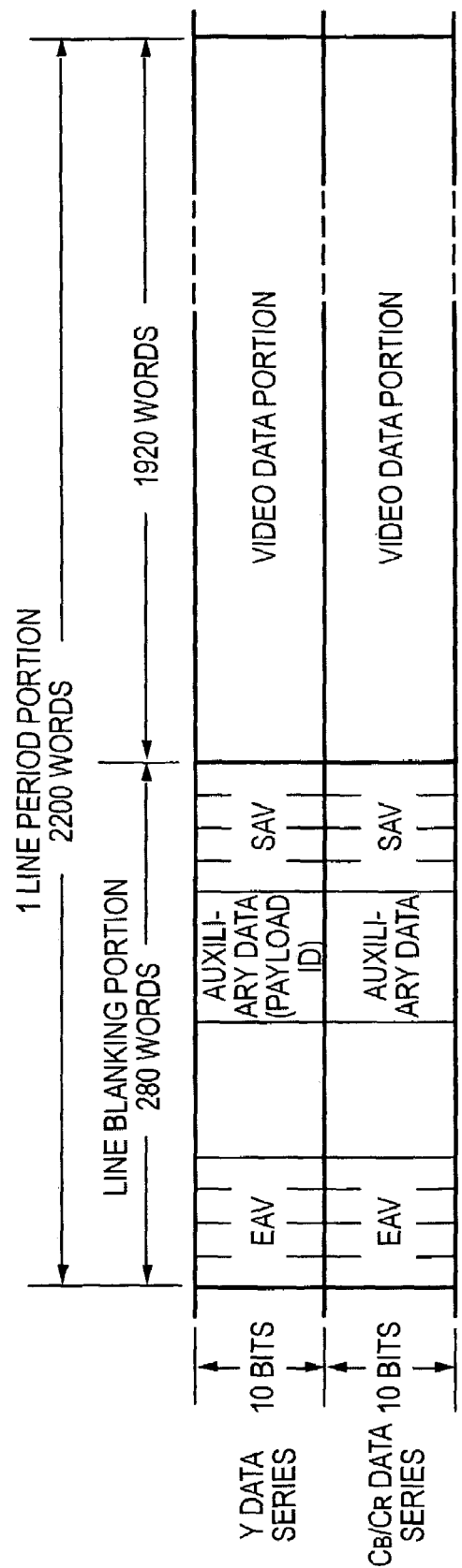
FIG. 3 is a conceptual diagram which shows a data format to be used for an operational explanation of the example shown in FIG. 1.

In the data processing section PD1, S/P conversion is applied to the HD-SDI signal DHS1 which is supplied thereto, in a S/P converting section 12, and it is converted into, for example, word string data Dh1 forming HD signals which are parallel digital video signals having a line portion data structure, as shown in FIG. 3. The line portion data structure shown in FIG. 3 is composed of a Y data series including a video data portion and a line blanking portion which represent luminance signal information in a video signal, and a $C_B/C_R$ data series including a video data portion and a line blanking portion which represent color difference signal information in the video signal. In each of the Y data series and the $C_B/C_R$ data series, a word bit number, which is a bit number of each word data configuring it, is set to 10 bits, and the Y data series and the $C_B/C_R$ data series are arranged in parallel under such a state that they were synchronized with each other, and therefore, as a whole, 20 bit word string data is formed. In addition, a word rate is set to 74.25 MB/s or 74.25/1.001 MB/s (in this application, both of them are referred to as 74.25 MB/s).

In each line blanking portion of each of the Y data series and the $C_B/C_R$ data series, timing reference code data SAV (Start of Active Video), which is to be located immediately before each video data portion and is composed of 4 words, is disposed, and timing reference code data EAV (End of Active Video), which is to be located immediately after each video data portion and is composed of 4 words, is disposed. 4 words, which are forming each of the timing reference code data SAV and EAV, are to be represented as 3FF, 000, 000, XYZ in hexadecimal expression. Each of 3FF and 000 is "prohibited code" which is not used as a word in a video data portion, and a combination of 3FF, 000, 000, XYZ does not appear in a video data portion.

In addition, between the timing reference code data SAV and the timing reference code data EAV in each line blanking portion of each of the Y data series and the $C_B/C_R$ data series, auxiliary data is disposed in addition to other data. Then, the auxiliary data, which is disposed in each line blanking portion of the Y data series, is to arbitrarily include identification data of 4 word configuration: Payload ID, which represents information as to video data of the HD signal.

Meanwhile, a line portion data structure shown in FIG. 3 is of such a case that a frame rate is set to 30 Hz. Therefore, in each of the Y data series and the $C_B/C_R$ data series, 1 line period portion is composed of 2200 words, and a line blanking portion in it is composed of 280 words, and a video data portion is composed of 1920 words.

The word string data Dh1, which is obtained from the S/P converting section 12, is supplied to a bit/word synchronization setup section 13. In the bit/word synchronization setup section 13, detection of timing reference code data SAV and EAV, which are contained in the word string data Dh1, is carried out, and on the basis of detection results of them, bit synchronization and word synchronization are established, and further, detection of a frame rate as to the word string data Dh1 is also carried out.

The word string data Dh1, which passed through the bit/word synchronization setup section 13, is written in a FIFO memory section 14, by 20 bits at a time, with a writing clock signal QW1 in which frequency is set to 74.25 MHz. Then, the word string data Dh1, which was written in the FIFO memory section 14, is read out by 40 bits at a time, with a reading clock signal QR1 in which frequency is set to 74.25/2 MHz=37.125 MHz, and supplied to a K28.5/P.ID inserting section 15 as word string data Dd1.

Figure 4:
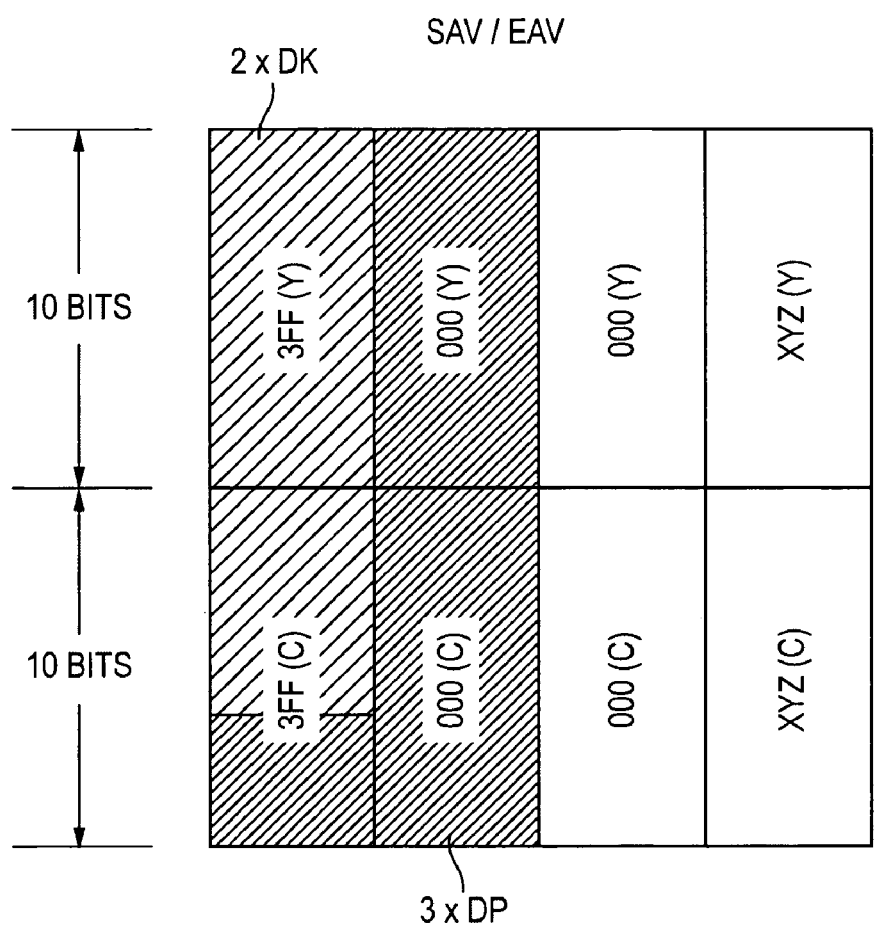
FIG. 4 is a conceptual diagram which shows a data format to be used for an operational explanation of the example shown in FIG. 1.

In the K28.5/P.ID inserting section 15, as shown in FIG. 4, 40 bits in total, which are 4 words (3FF(C), 3FF(Y), 000(C), 000(Y)) out of 8 words (3FF (C), 3FF (Y), 000(C), 000(Y), 000(C), 000(Y), XYZ(C), XYZ(Y): (Y) represents a word in the Y data series, and (C) represents a word in the $C_B/C_R$ data series) which form timing reference code SAV or EAV in each line blanking portion of the word string data Dd1, are replaced by 2 pieces of 8 bit word data DK and 3 pieces of 8 bit word data DP, and thereby, data inserting processing, in which the 8 bit word data DK and DP are inserted in the word string data Dd1, is carried out.

The 2 pieces of 8 bit word data DK is one which is converted into 10 bit word data called by a code name of "K28.5", which is not used as word data representing video signal information (8 bit word data: HGFEDCBA=10111100), when 8B/10B converting processing is applied to each of them. In addition, the 3 pieces of 8 bit word data DP is 3 pieces of 10 bit word data which correspond to 3 words from first one through third one out of 4 words configuring identification data: Payload ID which is included in the word string data Dh1 as auxiliary data and one which is converted into data functioning as identification data: Payload ID, when 8B/10B converting processing is applied to them.

From the K28.5/P.ID inserting section 15, word string data Dd1, to which inserting processing as to the 2 pieces of 8 bit word data DK and the 3 pieces of 8 bit word data DP was applied, is sent away by 40 bits at a time, and supplied to an 8B/10B converting section 16. In the 8B/10B converting section 16, as to the word string data Dd1, 8B/10B conversion, in which 40 bits thereof are converted into 50 bits sequentially, is carried out, and word string data De1 is formed. Then, from the 8B/10B converting section 16, the word string data De1 is sent away by 50 bits at a time, and it is used as output data from the data processing section PD1.

In addition, in the data processing section PD2, S/P conversion is applied to the HD-SDI signal DHS2, which is supplied thereto, in a S/P converting section 17, and it is converted into word string data Dh2 forming HD signals which are parallel digital video signals having the above-described line portion data structure as shown, for example, in the FIG. 3. Word string data Dh2, which is obtained from the S/P converting section 17, is supplied to a bit/word synchronizing setup section 18. In the bit/word synchronizing setup section 18, detection of timing reference code data SAV and EAV, which are included in the word string data Dh2, is carried out, and on the basis of detection results of them, bit synchronization and word synchronization are established.

The word string data Dh2, which passed through the bit/word synchronization setup section 18, is written in a FIFO memory section 19, by 20 bits at a time, with a writing clock signal QW1 in which frequency is set to 74.25 MHz. Then, the word string data Dh2, which was written in the FIFO memory section 19, is read out by 40 bits at a time, with a reading clock signal QR1 in which frequency is set to 74.25/2 MHz=37.125 MHz, and supplied to an 8B/10B converting section 20 as word string data Dd2. In the 8B/10B converting section 20, 8B/10B conversion as to the word string data Dd2, in which 40 bits thereof are converted into 50 bits sequentially, is carried out, and word string data De2 is formed. Then, from the 8B/10B converting section 20, the word string data De2 is sent away by 50 bits at a time, and it is used as output data from the data processing section PD2.

Each of the data processing sections PD3 to PDn is also the same as the data processing section PD2, and in the data processing sections PD3 to PDn, the same processing as processing which is carried out to the HD-SDI signal DHS2 to be supplied to the data processing section PD2 is carried out to HD-SDI signals DHS3 to DHSn which are supplied to them, respectively, and from the data processing sections PD3 to PDn, word string data De3 to Den, each of which is sent away by 50 bits at a time, are obtained as output data.

Under the suchlike circumstances, in case that the HD-SDI signals DHS1 to DHSn, which are supplied to the data processing sections PD1 to PDn respectively, are ones based on each of HD signals of n channels including at least two HD signals with different frame rates each other, each of word string data Dh1 to Dhn, which are formed in the data processing sections PD1 to PDn respectively, is to be one having a line portion data structure based on the word string data Dh1 which is formed in the data processing section PD1. That is, each of the word string data Dh2 to Dhn is to be one taking a line portion data structure which is formed along a line portion data structure of the word string data Dh1.

Figure 5:
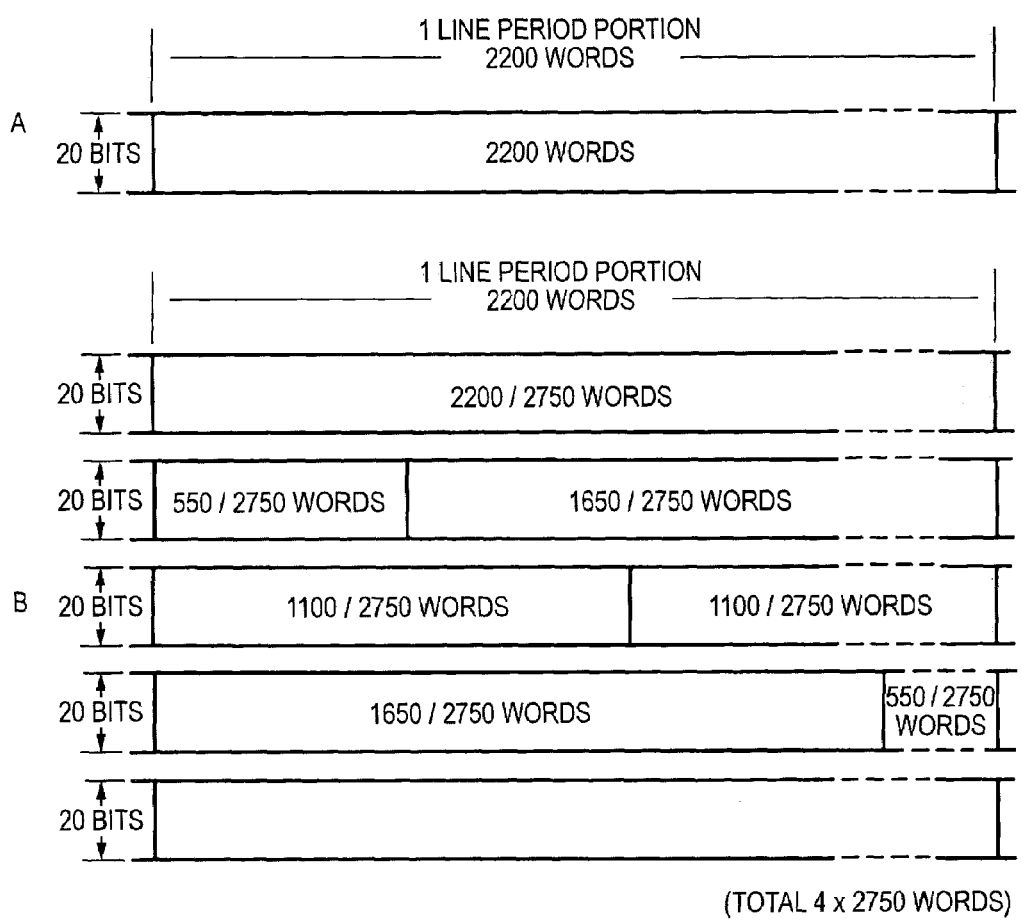
FIG. 5 is a conceptual diagram which shows a data format to be used for an operational explanation of the example shown in FIG. 1.

For example, in case that the HD-SDI signal DHS1, which is supplied to the data processing section PD1, is one based on an HD signal in which a frame rate is set to 30 Hz, and the HD-SDI signal DHS2, which is supplied to the data processing section PD2, is one based on an HD signal in which a frame rate is set to 24 Hz, the word string data Dh1, which is formed in the data processing section PD1, is made to have a line portion data structure shown in FIG. 3 as described above, and as shown in A of FIG. 5, 1 line period portion is to be configured with 2200 words, in tune with 1 line period portion of an original HD signal of the HD-SDI signal DHS1, and in addition to that, the word string data Dh2, which is formed in the data processing section PD2, is also to be configured so as to take a line portion data structure in which 1 line portion is configured with 2200 words, along the line of the word string data Dh1 which is formed in the data processing section PD1.

On such occasion, 1 line period portion of an HD signal in which a frame rate is set to 30 Hz is configured with 2200 words, whereas 1 line period portion of an HD signal in which a frame rate is set to 24 Hz is configure with 2750 words. Therefore, as described above, when the word string data Dh2, which is formed in the data processing section PD2, is configured to take a line portion data structure in which 1 line period portion is configured with 2200 words, along the line of the word string data Dh1 which is formed in the data processing section PD1, 1 line period portion can not be accommodated in 1 line period portion (2750 words) of an HD signal which became a basis of the HD-SDI signal DHS2 supplied to the data processing section PD2 and in which a frame rate is set to 24 Hz. Consequently, at this time, the word string data Dh2, which is formed in the data processing section PD2, is to be of such a structure that 4 line period portions (4×2750=11000 words) of an HD signal, which became a basis of the HD-SDI signal DHS2 supplied to the data processing section PD2, are accommodated in 5 line period portions (5×2200=11000 words).

Word string data De1 to Den, which are obtained respectively from the data processing sections PD1 to PDn incorporated in the parallel data forming section 11 as output data, are sent away as word string data of n channels from the parallel data forming section 11. On such occasion, a mode selection controlling section 21, which was disposed in the parallel data forming section 11, detects identification data: Payload ID which is included in word string data Dh1 to Dhn formed in the data processing sections PD1 to Pdn, and detects an operation mode at that time, for example, an operation mode 1 in which the HD-SDI signals DHS1 to DHS5 of 5 channels are supplied to the parallel data forming section 11, or an operation mode 2 in which the HD-SDI signals DHS1 to DHS6 of 6 channels are supplied to the parallel data forming section 11, and sends away a mode selection control signal CMT for having an entirety of the example shown in FIG. 1 taken a data processing mode which corresponds to the detected operation mode. As a result of that, the example shown in FIG. 1 is to take a data processing mode which fits in with an operation mode at that time, across its entirety.

The word string data De1 to Den of n channels, which are obtained from the parallel data forming section 11, are supplied to a data multiplexing section 22. In the data multiplexing section 22, the word string data De1 to Den are multiplexed by a method of word multiplexing, under such a state that each of them was synchronized each other, and thereby, multiplex word string data Dm is formed.

The multiplex word string data Dm, which is formed in the data multiplexing section 22, is made as 10 bit word string data, a line portion data configuration of which is configured by, for example, a line blanking portion which is obtained by line blanking portions in each of the word string data De1 to Den being multiplexed, and a video data portion which is obtained by video data portions in each of the word string data De1 to Den being multiplexed. Then, at the front of multiplexed timing reference code data SAV or EAV in a line blanking portion of the multiplex word string data Dm which is made as the suchlike 10 bit word string data, disposed are K28.5 of 2 bytes and identification data: Payload ID of 3 bytes, based on 2 pieces of 8 bit word data DK and 3 pieces of 8 bit word data DP, which were replaced and inserted into the word string data Dd1 in the data processing section PD1 which was incorporated in the parallel data forming section 11.

The multiplex word string data Dm, which is obtained from the data multiplexing section 22, is written in a memory section 23, by 50×n bits thereof at a time, with a writing clock signal QW2 in which frequency is set to 74.25/2 MHz=37.125 MHz. Then, the multiplex word string data Dm, which was written in the memory section 23, is read out from the memory section 23, by 50×n bits at a time, with a reading clock signal QR2 in which frequency is set to 83.53125/2 MHz≈41.766 MHz, and supplied to a data length converting section 24, as word string data Do.

In the data length converting section 24, data length converting processing, in which 50×n bits thereof are changed to 256 bits sequentially, is applied to the word string data Do, and word string data Dp is formed. At this time, as to the word string data Dp, additional data, which is, for example, used for speed adjustment, is added thereto, according to need, and when the additional data is added, the additional data is to include 10 bit word data called by a code name of "K28.3" of 2 bytes, which is not used as word data representing video signal information, at its front portion.

Figure 6:
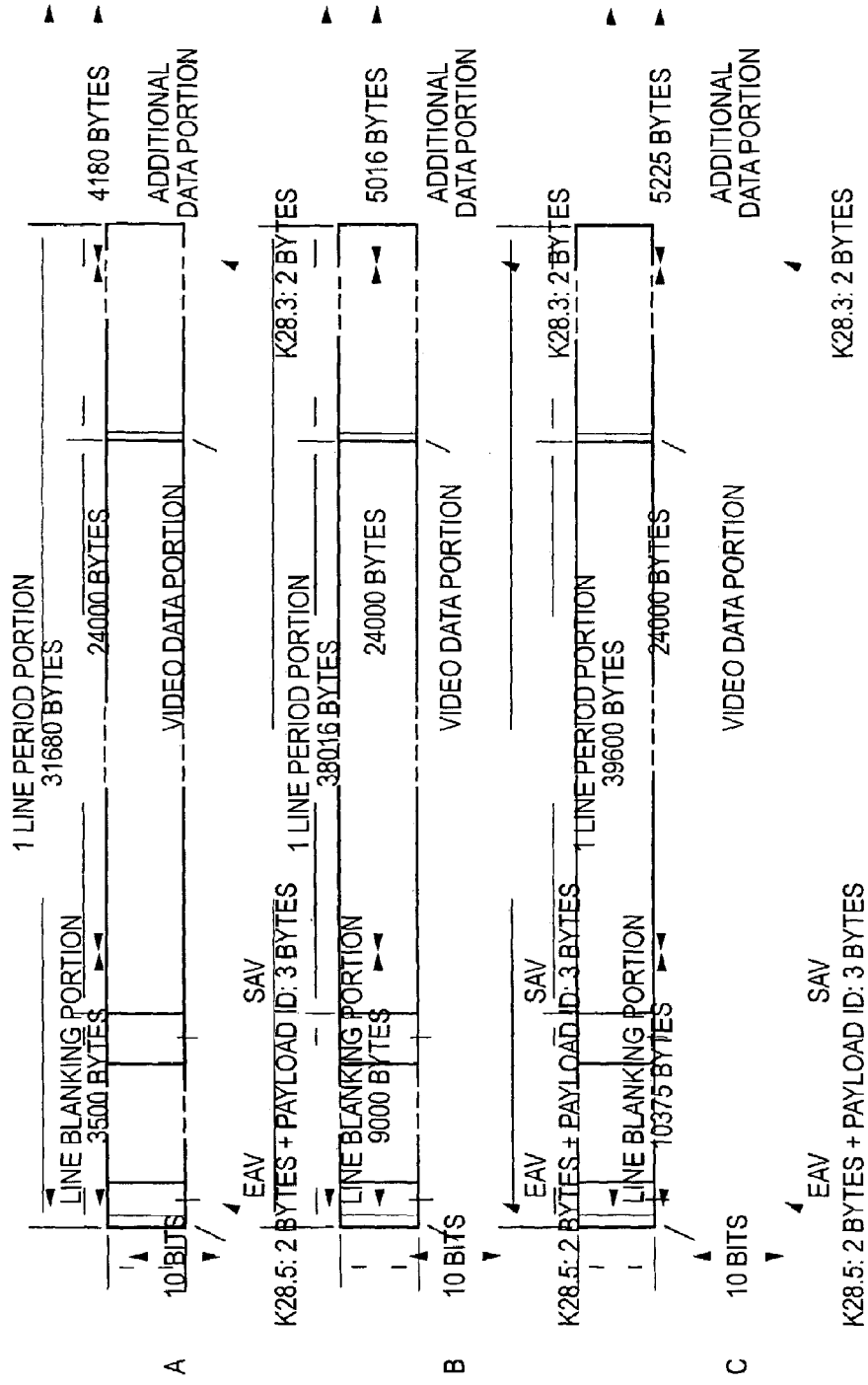
FIG. 6 is a conceptual diagram which shows a data format to be used for an operational explanation of the example shown in FIG. 1.

The suchlike word string data Dp has a line portion data structure shown in A of FIG. 6, when each of for example, HD-SDI signals DHS1 to DHS5 is to have a frame rate of 30 Hz, under such a basis that HD-SDI signals DHS1 to DHS5 of 5 channels are supplied to the parallel data forming section 11, and to have a line portion data structure shown in B of FIG. 6, when each of the HD-SDI signals DHS1 to DHS5 has a frame rate of 25 Hz, and further, to have a line portion data structure shown in C of FIG. 6, when each of the HD-SDI signals DHS1 to DHS5 has a frame rate of 24 Hz. Each of these line portion data structures, which are shown in A, B and C of FIG. 6 respectively, has an additional data portion in which additional data was disposed, as one which comes next to a video data portion, and "K28.3" of 2 bytes is inserted in the front of the additional data portion.

Figure 7:
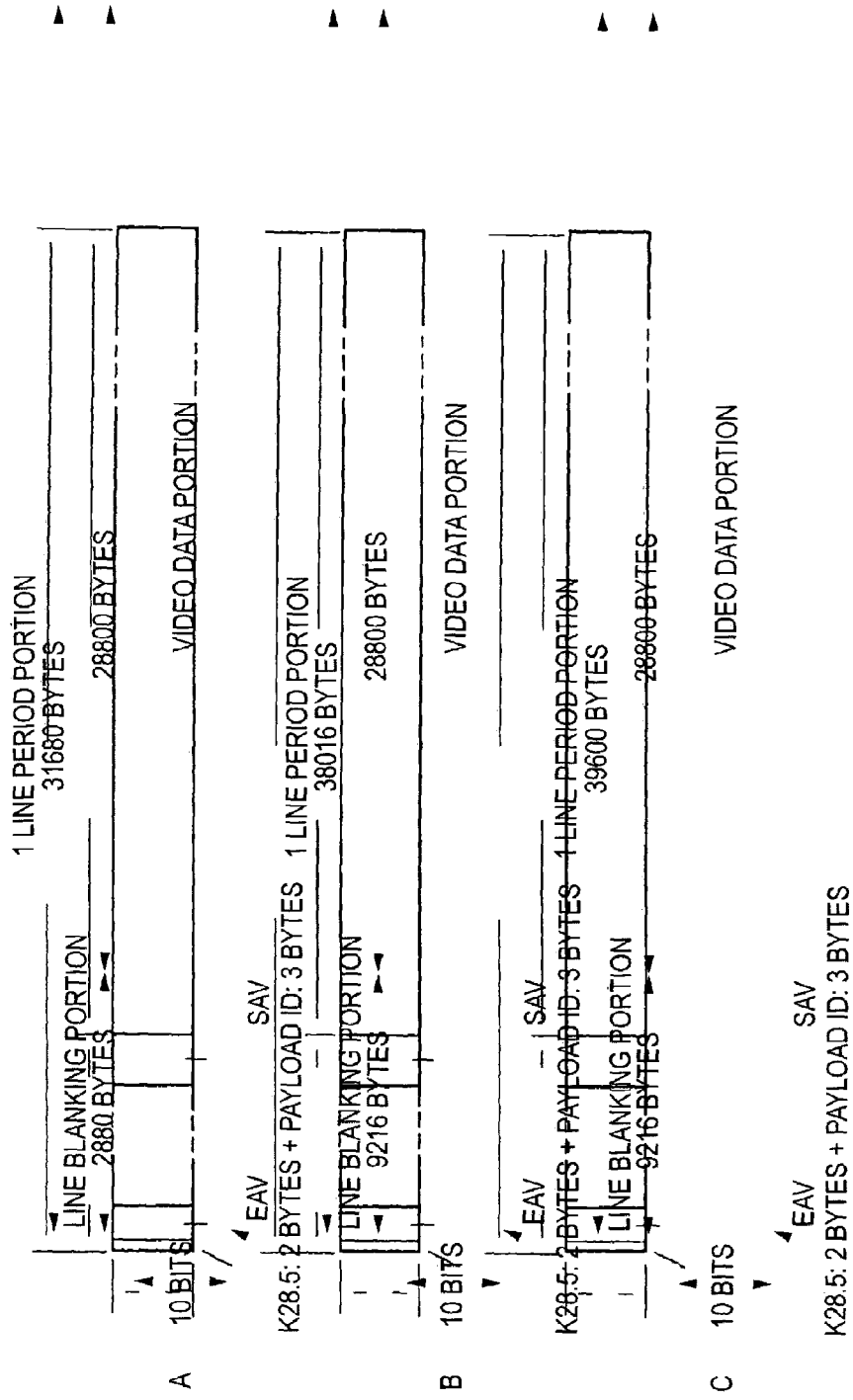
FIG. 7 is a conceptual diagram which shows a data format to be used for an operational explanation of the example shown in FIG. 1.

In addition, the word string data Dp is to have a line portion data structure shown in A of FIG. 7, when each of the HD-SDI signals DHS1 to DHS6 has, for example, a frame rate of 30 Hz, under such a basis that HD-SDI signals DHS1 to DHS6 of 6 channels are supplied to the parallel data forming section 11, and to have a line portion data structure shown in B of FIG. 7, when each of the HD-SDI signals DHS1 to DHSn has a frame rate of 25 Hz, and further, to have a line portion data structure shown in C of FIG. 7, when each of the HD-SDI signals DHS1 to DHSn ha a frame rate of 24 Hz. Each of these line portion data structures, which are shown in A, B and C of FIG. 7 respectively, does not have an additional data portion in which additional data was disposed.

The word string data Dp, which is obtained from the data length converting section 24, is written in a memory section 25, by 256 bits thereof at a time, with a writing clock signal QW3 in which frequency is set to 83.53125/2 MHz≈41.766 MHz. Then, the word string data Dp, which was written in the memory section 25, is read out from the memory section 25, by 64 bits at a time, with a reading clock signal QR3 in which frequency is set to 83.53125×2 MHz=167.0625 MHz, and supplied to a multiple channel data forming section 26, as word string data Dq.

In the multiple channel data forming section 26, on the basis of the word string data Dq which is supplied by 64 bits at a time, with a cycle of 1/167.0625 MHz, m channels in each of which a bit rate is set to 668/25 Mb/s, for example, bit string data DSX of 16 channels, are formed. By that means, the bit string data DSX of 16 channels, which is obtained from the multiple channel data forming section 26, is supplied to a data multiplexing and P/S converting section 27.

In the data multiplexing and P/S converting section 27, the bit string data DSX of 16 channels is multiplexed, and P/S conversion is applied to parallel data which is obtained by that means, to form bit string data DTG in which a bit rate is set to 10 Gb/s or more, for example, 668.25 Mb/s×16=10.692 Gb/s. In this manner, the bit string data DTG, which is obtained from the data multiplexing and P/S converting section 27, is one which was formed on the basis of HD-SDI signals DHS1 to DHSn of n channels which were supplied to the parallel data forming section 11, and therefore, it is to be serial digital video signals forming bit string data in which a bit rate is set to 10 Gb/s or more, for example, 10.692 Gb/s.

Then, the bit string data DTG, which is obtained from the data multiplexing and P/S converting section 27, is supplied to an electric light converting section 28 which forms a data sending away section. The electric light converting section 28 converts the bit string data DTG into an optical signal DL, and sends away the optical signal DL so as to transmit it through an optical signal transmission cable 29 which is formed by an optical fiber etc.

As described above, in the embodiment 1 which is one example of a data transmitting apparatus of the invention, multiplexing processing was applied to HD-SDI signals DHS1 to DHSn of n channels, for example, 5 channels or 6 channels, and after that, they can be converted into bit string data DTG in which a bit rate is set to 10 Gb/s or more, for example, 10.692 Gb/s, and sent away so as to transmit it. Therefore, it becomes possible to effectively carry out serial transmission of HD-SDI signals which are to have a standardized bit rate of for example, 1.485 Gb/s, under such a basis that multiplexing processing was applied to that multiple channels.

Embodiment 2

Figure 8:
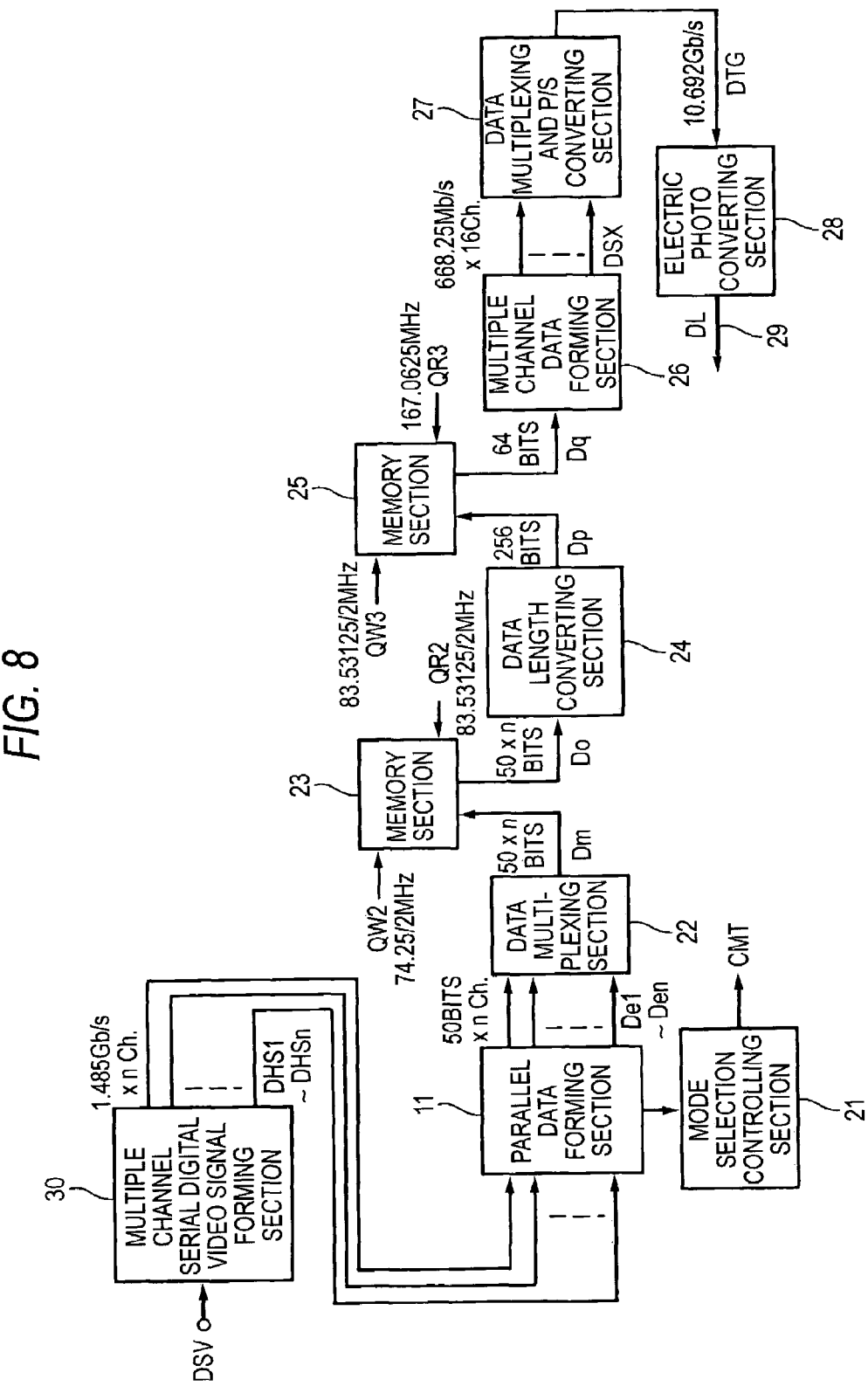
FIG. 8 is a block diagram which shows one example of a data transmitting apparatus described in an embodiment of the invention.

FIG. 8 shows one example (embodiment 2) of a data transmitting apparatus of the invention.

In the example shown in FIG. 8, i.e., in the embodiment 2, on an input terminal side of a parallel data forming section 11 which is to be the same as the parallel data forming section 11 shown in FIG. 1, a multiple channel serial digital video signal forming section 30 is provided. To the multiple channel serial digital video signal forming section 30, specific parallel digital video signals DSV, which are to be any one of next generation camera signals, HD super motion signals, 4 k×2 k signals etc., and which form word string data which was configured with a specific frame rate, a quantifying bit number, and parallel arrangement of green color, blue color and red color original color signal data series, are supplied.

In the multiple channel serial digital video signal forming section 30, the specific parallel digital video signals DSV, which are to be any one of next generation camera signals, HD super motion signals, 4 k×2 k signals etc., are converted into HD-SDI signals DHS1 to DHSn of n channels, each of which has a standardized bit rate of for example, 1.485 Gb/s. For example, in case that the specific parallel digital video signals DSV are the HD super motion signals, they are converted into HD-SDI signals DHS1 to DHS6 of 6 channels, under such a basis that auxiliary bit, which compensates for bit shortage, is added, and in addition, in case of the 4 k×2 k signals, they are converted into HD-SDI signals DHS1 to DHS8 of 8 channels, under such a basis that auxiliary bit, which compensates for bit shortage, is added.

In this manner, the HD-SDI signals DHS1 to DHSn of n channels, which are based on the specific parallel digital video signals DSV which are obtained from the multiple channel serial digital video signal forming section 30 and are to be any one of next generation camera signals, HD super motions signals, 4 k×2 k signals etc., are supplied to the parallel data forming section 11. Each of these HD-SDI signals DHS1, DHS2, . . . , DHSn of n channels are to be equivalent to ones which are obtained by serialization of HD signals in which, for example, a frame rate is set to 30 Hz, 25 Hz or 24 Hz, and an effective line number in each frame and an effective word number in each line are set to 1080 lines and 1920 words, and a word bit number (quantifying bit number) is set to 10 bits, and a data format is set to a Y, $C_B/C_R$ format. Then, such a state that the HD-SDI signals DHS1 to DHSn of n channels, which are based on for example, next generation camera signals, are supplied to the parallel data forming section 11, is defined as an operation mode 3, and such a state that the HD-SDI signals DHS1 to DHSn of n channels, which are based on the HD super motion signals, are supplied to the parallel data forming section 11, is defined as an operation mode 4, and further, such a state that the HD-SDI signals DHS1 to DHSn of n channels, which are based on the 4 k×2 k signals, are supplied to the parallel data forming section 11, is defined as an operation mode 5.

Figure 2:
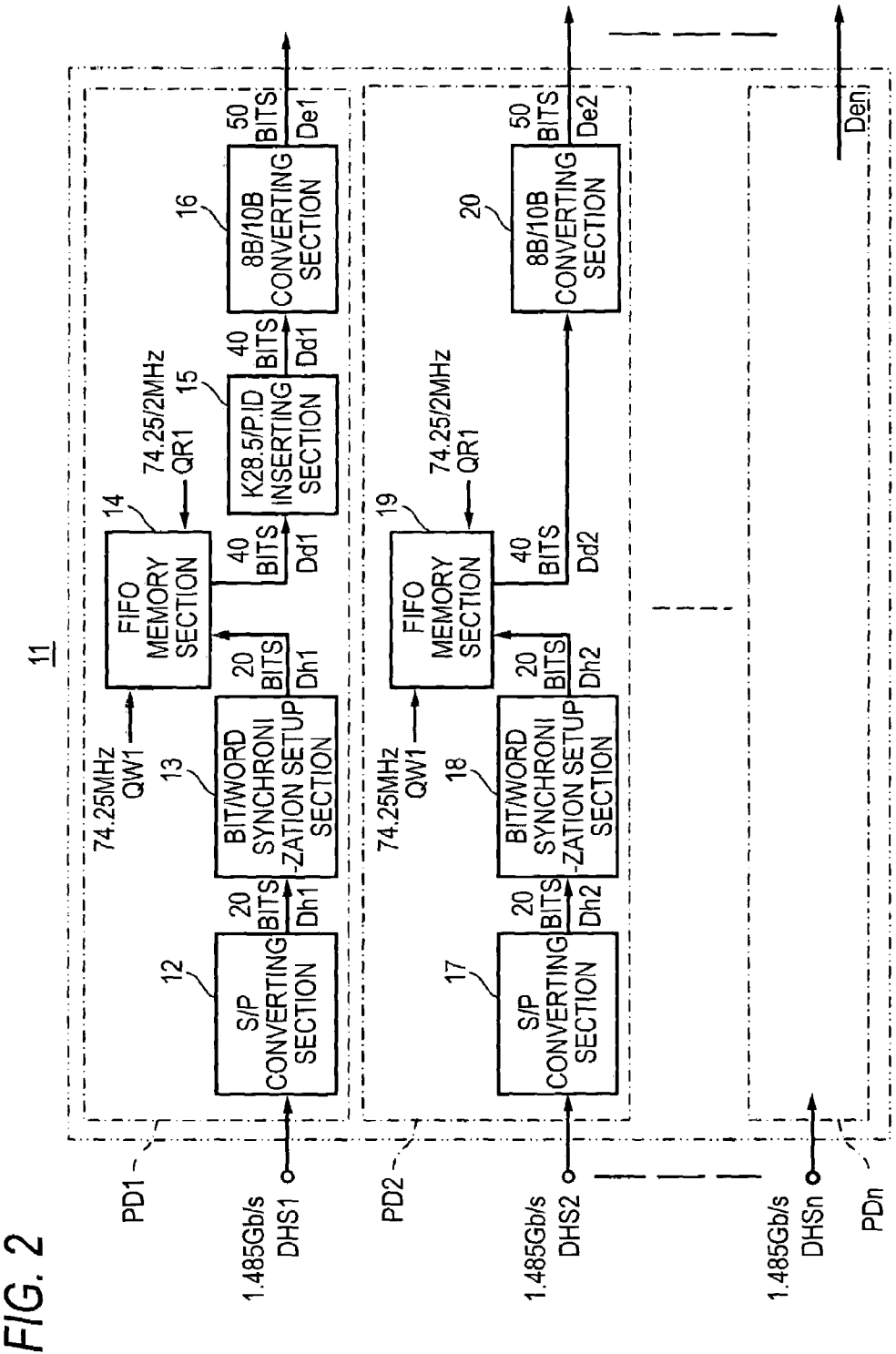
FIG. 2 is a block diagram which shows a concrete configuration example of a parallel data forming section in the example shown in FIG. 1.

The parallel data forming section 11 shown in FIG. 8 also incorporates a data processing section PD1 to the HD-SDI signal DHS1, a data processing section PD2 to the HD-SDI signal DHS2, . . . , a data processing section PDn to the HD-SDI signal DHSn, as shown in FIG. 2, in the same manner as the parallel data forming section 11 shown in FIG. 1. In addition, a mode selection controlling section 21, which was disposed in the parallel data forming section 11, detects identification data: Payload Id which is included in word string data Dh1 to Dhn formed in the data processing sections PD1 to Pdn, and detects an operation mode at that time, for example, the operation mode 3 in which the HD-SDI signals DHS1 to DHSn of n channels, which are based on the next generation camera signals, are supplied to the parallel data forming section 11, or the operation mode 4 in which the HD-SDI signals DHS1 to DHSn of n channels, which are based on the HD super motion signals, are supplied to the parallel data forming section 11, or the operation mode 5 in which the HD-SDI signals DHS1 to DHSn of n channels, which are based on the 4 k×2 k signals, are supplied to the parallel data forming section 11, and sends away a mode selection control signal CMT for having an entirety of the example shown in FIG. 8 taken a data processing mode which corresponds to the detected operation mode. As a result of that, the example shown in FIG. 8 is to take a data processing mode which fits in with an operation mode at that time, across its entirety.

Other portions in the embodiment 2 shown in FIG. 8 are similar to corresponding portions in the embodiment 1 shown in FIG. 1, and therefore, blocks and signals or data in FIG. 8, which correspond to block and signals or data shown in FIG. 1, are described with reference numerals and signs which are shared with FIG. 1, so that overlapped explanations will be omitted.

In the suchlike embodiment 2 shown in FIG. 8 which is one example of a data transmitting apparatus of the invention, HD-SDI signals DHS1 to DHSn of n channels, which are based on specific parallel digital video signals DSV, which are to be any one of next generation camera signals, HD super motion signals, 4 k×2 k signals etc., can be converted into bit string data DTG in which a bit rate is set to 10 Gb/s or more, for example, 10.692 Gb/s. after multiplexing processing was applied to them, and sent away so as to transmit it. Therefore, it becomes possible to realize serial transmission as to each of next generation camera signals, HD super motion signals, 4 k×2 k signals etc., in the form which is available for practical use.

Embodiment 3

Figure 9:
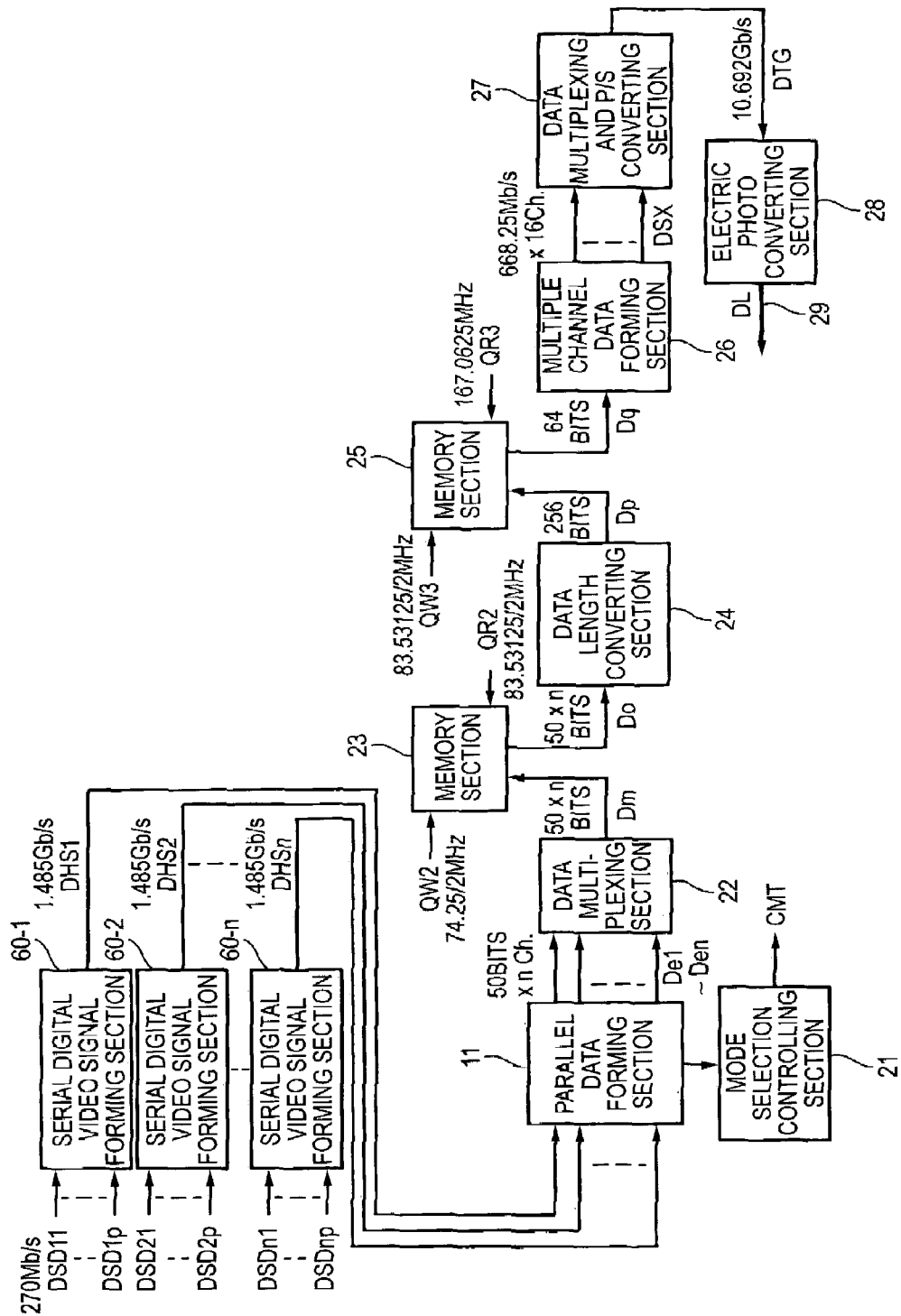
FIG. 9 is a block diagram which shows one example of a data transmitting apparatus described in an embodiment of the invention.

FIG. 9 shows one example (embodiment 3) of a data transmitting apparatus of the invention.

In the example shown in FIG. 9, i.e., in the embodiment 3, on an input terminal side of a parallel data forming section 11 which is to be the same as the parallel data forming section 11 shown in FIG. 1, a plurality of serial digital video signal forming sections 60-1, 60-2, ..., 60-n of n channels, which are, for example, 5 pieces or 6 pieces, are provided. To the serial digital video signal forming section 60-1, SD signals DSD11 to DSD1p of p channels, for example, 4 channels, in each of which a bit rate is set to standardized 270 Mb/s, are supplied as serial digital video signals of p channels forming bit string data each of which has a lower bit rate defined by a standard than a bit rate of HD-SDI signals in which a bit rate is to be set to standardized 1.485 Gb/s. In the same manner, to the serial digital video signal forming section 60-2, SD signals DSD21 to DSD2p of p channels, for example, 4 channels, in each of which a bit rate is set to standardized 270 Mb/s, are supplied as serial digital video signals of p channels forming bit string data each of which has a lower bit rate defined by a standard than a bit rate of HD-SDI signals in which a bit rate is to be set to standardized 1.485 Gb/s, ..., and to the serial digital video signal forming section 60-n, SD signals DSDn1 to DSDnp of p channels, for example, 4 channels, in each of which a bit rate is set to standardized 270 Mb/s, are supplied as serial digital video signals of p channels forming bit string data each of which has a lower bit rate defined by a standard than a bit rate of HD-SDI signals in which a bit rate is to be set to standardized 1.485 Gb/s.

In this manner, to n pieces of the serial digital video signal forming sections 60-1, 60-2, ..., 60-n, SD signals DSD11 to DSD1p, DSD21 to DSD2p, ..., DSDn1 to DSDnp of p×n channels, for example, 20 channels or 24 channels are supplied. Each of these SD signals DSD11 to DSD1p, DSD21 to DSD2p, ..., DSDn1 to DSDnp are to be obtained as a result of serialization of D1 signals in which, for example, a frame rate is set to 30 Hz or 25 Hz, and a line number in each frame is set to 525 lines or 625 lines, and a word bit number (quantifying bit number) is set to 10 bits, and which was configured by applying word multiplexing processing to a Y data series and a $C_B/C_R$ series.

Then, the serial digital video signal forming section 60-1 applies multiplexing processing which conforms to, for example, SMPTE 349M, i.e., SMPTE STANDARD SMPTE 349M-2001, for Television—Transport of Alternate Source Image Formats through SMPTE 292M, which was established by SMPTE, to SD signals DSD11 to DSD1p of p channels, and forms a HD-SDI signal DHS1 of 1 channel which is based on the SD signals DSD11 to DSD1p of p channels. In the same manner, the serial digital video signal forming section 60-2 applies multiplexing processing which conforms to, for example, SMPTE 349M which was established by SMPTE, to SD signals DSD21 to DSD2p of p channels, and forms a HD-SDI signal DHS2 of 1 channel which is based on the SD signals DSD21 to DSD2p of p channels, ..., and the serial digital video signal forming section 60-n applies multiplexing processing which conforms to, for example, SMPTE 349M which was established by SMPTE, to SD signals DSDn1 to DSDnp of p channels, and forms a HD-SDI signal DHSn of 1 channel which is based on the SD signals DSDn1 to DSDnp of p channels.

As a result of that, from n pieces of the serial digital video signal forming sections 60-1, 60-2, ..., 60-n, HD-SDI signals DHS1, DHS2, ..., DHSn of n channels, for example, 5 channels or 6 channels are obtained, and they are supplied to the parallel data forming section 11. Each of these HD-SDI signals DHS1, DHS2, ..., DHSn of n channels are also to be obtained by serialization of HD signals in which, for example, a frame rate is set to 30 Hz or 25 Hz, and an all line number in each frame and an all sample number in each line are set to 525 lines and 4719 samples, or 625 lines and 4752 samples, respectively, and a word bit number (quantifying bit number) is set to 10 bits, and a data format is set to a Y, $C_B/C_R$ format. Then, such a state that the n channels are set to 5 channels and HD-SDI signals DHS1 to DHS5 of 5 channels are supplied from the serial digital video signal forming sections 60-1, 60-2, ..., 60-n to the parallel data forming section 11 is defined as an operation mode 1, and in addition, such a state that the n channels are set to 6 channels and HD-SDI signals DHS1 to DHS6 of 6 channels are supplied from the serial digital video signal forming sections 60-1, 60-2, ..., 60-n to the parallel data forming section 11 is defined as an operation mode 2.

The parallel data forming section 11 shown in FIG. 9 also incorporates a data processing section PD1 to the HD-SDI signal DHS1, a data processing section PD2 to the HD-SDI signal DHS2, ..., a data processing section PDn to the HD-SDI signal DHSn, as shown in FIG. 2, in the same manner as the parallel data forming section 11 shown in FIG. 1. In addition, a mode selection controlling section 21, which was disposed in the parallel data forming section 11, detects identification data: Payload ID which is included in word string data Dh1 to Dhn formed in the data processing sections PD1 to Pdn, and detects an operation mode at that time, for example, the operation mode 1 in which HD-SDI signals DHS1 to DHS5 of 5 channels are supplied from the serial digital video signal forming sections 60-1, 60-2, ..., 60-n to the parallel data forming section 11, or the operation mode 2 in which HD-SDI signals DHS1 to DHS6 of 6 channels are supplied from the serial digital video signal forming sections 60-1, 60-2, ..., 60-n to the parallel data forming section 11, and sends away a mode selection control signal CMT for having an entirety of the example shown in FIG. 9 taken a data processing mode which corresponds to the detected operation mode. As a result of that, the example shown in FIG. 9 is to take a data processing mode which fits in with an operation mode at that time, across its entirety.

Other portions in the embodiment 3 shown in FIG. 9 are similar to corresponding portions in the embodiment 1 shown in FIG. 1, and therefore, blocks and signals or data in FIG. 9, which correspond to block and signals or data shown in FIG. 1, are described with reference numerals and signs which are shared with FIG. 1, so that overlapped explanations will be omitted.

In the suchlike embodiment 3 shown in FIG. 9 which is one example of a data transmitting apparatus of the invention, after multiplexing processing was applied to HD-SDI signals DHS1 to DHSn of n channels, for example, 5 channels or 6 channels, which are based on SD signals DSD11 to DSD1p, DSD21 to DSD2p, ..., DSDn1 to DSDnp of p×n channels, for example, 20 channels or 24 channels, they can be converted into bit string data DTG in which a bit rate is set to 10 Gb/s or more, for example, 10.692 Gb/s, and sent away so as to transmit it. Therefore, it becomes possible to realize serial transmission as to SD signals of multiple channels under such a state that multiplexing processing was applied to them, as one which is available for practical use.

Embodiment 4

Figure 10:
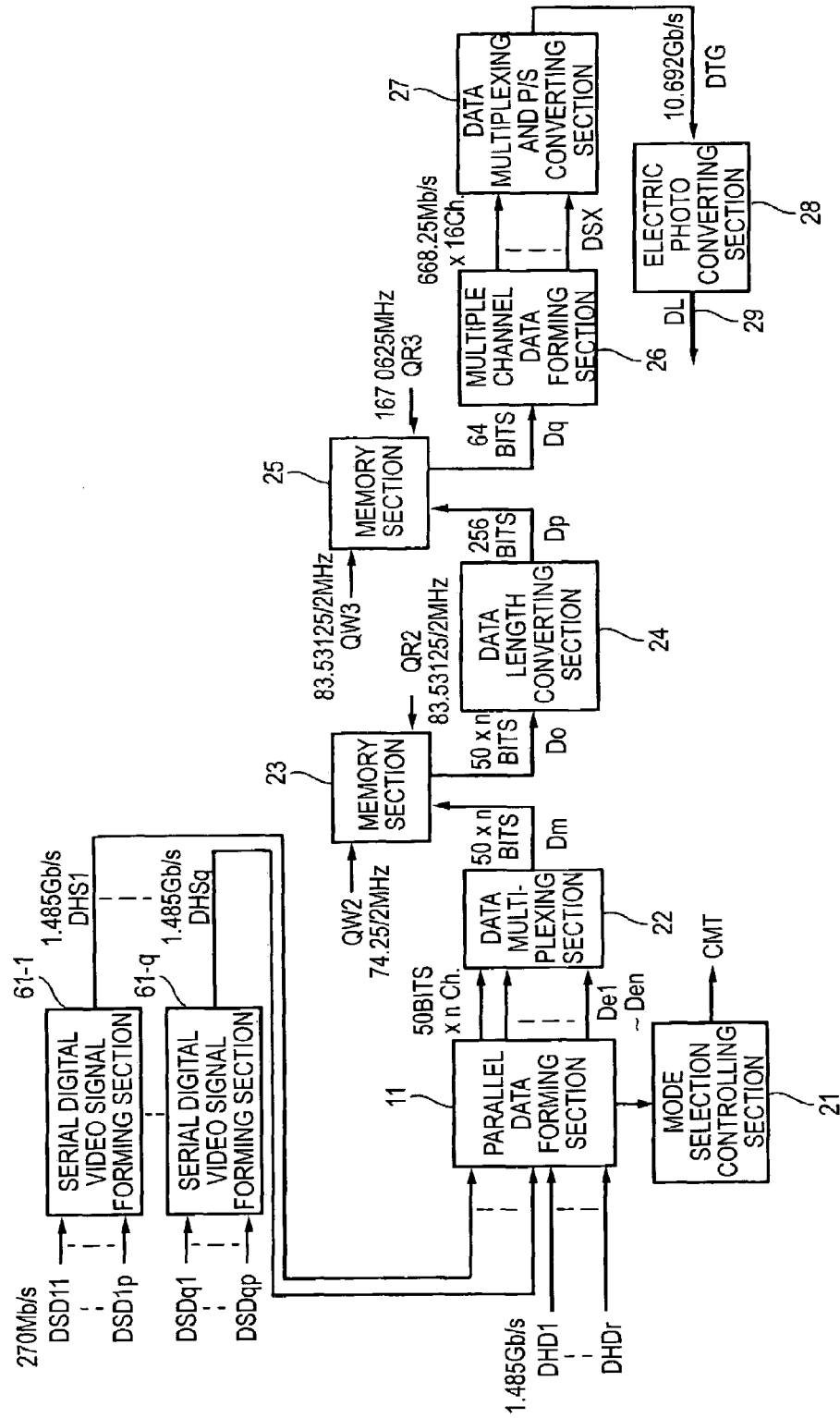
FIG. 10 is a block diagram which shows one example of a data transmitting apparatus described in an embodiment of the invention.

FIG. 10 shows one example (embodiment 4) of a data transmitting apparatus according to an embodiment of the invention.

In the example shown in FIG. 10, i.e., in the embodiment 4, on an input terminal side of a parallel data forming section 11 which is to be the same as the parallel data forming section 11 shown in FIG. 1, q pieces, for example, 3 pieces or 2 pieces of serial digital video signal forming sections 61-1 to 61-q are provided. To the serial digital video signal forming section 61-1, SD signals DSD11 to DSD1p of p channels, for example, 4 channels, in each of which a bit rate is set to standardized 270 Mb/s, are supplied as serial digital video signals of p channels forming bit string data each of which has a lower bit rate defined by a standard than a bit rate of HD-SDI signals in which a bit rate is to be set to standardized 1.485 Gb/s, . . . , and, to the serial digital video signal forming section 61-q, SD signals DSDq1 to DSDqp of p channels, for example, 4 channels, in each of which a bit rate is set to standardized 270 Mb/s, are supplied as serial digital video signals of p channels forming bit string data each of which has a lower bit rate defined by a standard than a bit rate of HD-SDI signals.

In this manner, to q pieces of the serial digital video signal forming sections 61-1 to 61-q, SD signals DSD11 to DSD1p, . . . , DSDq1 to DSDqp of p×q channels, for example, 12 channels or 8 channels are supplied. Each of these SD signals DSD11 to DSD1p, . . . , DSDq1 to DSDqp are to be obtained as a result of serialization of D1 signals in which, for example, a frame rate is set to 30 Hz or 25 Hz, and a line number in each frame is set to 525 lines or 625 lines, and a word bit number (quantifying bit number) is set to 10 bits, and which was configured by applying word multiplexing processing to a Y data series and a $C_B/C_R$ data series.

Then, the serial digital video signal forming section 61-1 applies multiplexing processing which conforms to, for example, SMPTE 349M which was established by SMPTE, to SD signals DSD11 to DSD1p of p channels, and forms a HD-SDI signal DHS1 of 1 channel which is based on the SD signals DSD11 to DSD1p of p channels, . . . , and the serial digital video signal forming section 61-q applies multiplexing processing which conforms to, for example, SMPTE 349M which was established by SMPTE, to SD signals DSDq1 to DSDqp of p channels, and forms a HD-SDI signal DHSq of 1 channel which is based on the SD signals DSDq1 to DSDqp of p channels.

As a result of that, from q pieces of the serial digital video signal forming sections 61-1 to 61-q, HD-SDI signals DHS1 to DHSq of q channels, for example, 3 channels or 2 channels are obtained, and they are supplied to the parallel data forming section 11. Each of these HD-SDI signals DHS1 to DHSq of q channels are also to be obtained by serialization of HD signals in which, for example, a frame rate is set to 30 Hz or 25 Hz, and an all line number in each frame and an all sample number in each line are set to 525 lines and 4719 samples, or 625 lines and 4752 samples, respectively, and a word bit number (quantifying bit number) is set to 10 bits, and a data format is set to a Y, $C_B/C_R$ format.

In addition, to the parallel data forming section 11, HD-SDI signals DHD1 to DHDr of r(=n−q) channels, for example, 2 channels or 3 channels, each of which is to have a bit rate of standardized 1.485 Gb/s are supplied. Each of the suchlike HD-SDI signals DHD1 to DHDr of r channels is also to be equivalent to ones which are obtained as a result of serialization of HD signals in which, for example, a frame rate is set to 30 Hz, 25 Hz or 24 Hz, and an effective line number in each frame and an effective word number in each line are set to 1080 lines and 1920 words, and a word bit number (quantifying bit number) is set to 10 bits, and a data format is set to a Y, $C_B/C_R$ format.

As a result of that, to the parallel data forming section 11, HD-SDI signals DHS1 to DHSq and DHD1 to DHDr of n channels, for example, 5 channels in total of HD-SDI signals DHS1 to DHSq of q channels from q pieces of the serial digital video signal forming sections 61-1 to 61-q and HD-SDI signals DHD1 to DHDr of r(=n−q) channels, are to be supplied. Then, such the parallel data forming section 11 shown in FIG. 10 also incorporates n pieces of data processing sections to the HD-SDI signals DHS1 to DHSq and DHD1 to DHDr of n channels, which correspond to the data processing sections PD1, PD2, . . . , PDn in the parallel data forming section 11 shown in FIG. 1.

Other portions in the embodiment 4 shown in FIG. 10 are similar to corresponding portions in the embodiment 1 shown in FIG. 1, and therefore, blocks and signals or data in FIG. 10, which correspond to block and signals or data shown in FIG. 1, are described with reference numerals and signs which are shared with FIG. 1, so that overlapped explanations will be omitted.

In the suchlike embodiment 4 shown in FIG. 10 which is one example of a data transmitting apparatus of the invention, after multiplexing processing was applied to HD-SDI signals DHS1 to DHSq and DHD1 to DHDr of n channels, for example, 5 channels, which are based on SD signals DSD11 to DSD1p, . . . , DSDq1 to DSDqp of p×q channels, for example, 12 channels or 8 channels, and HD-SDI signal DHD1 to DHDr of r=n−q channels, for example, 2 channels or 3 channels, they can be converted into bit string data DTG in which a bit rate is set to 10 Gb/s or more, for example, 10.692 Gb/s, and sent away so as to transmit it. Therefore, it becomes possible to realize serial transmission as to SD signals and HD-SDI signals of multiple channels under such a basis that multiplexing processing was applied to them, as one which is available for practical use.

Embodiment 5

Figure 11:
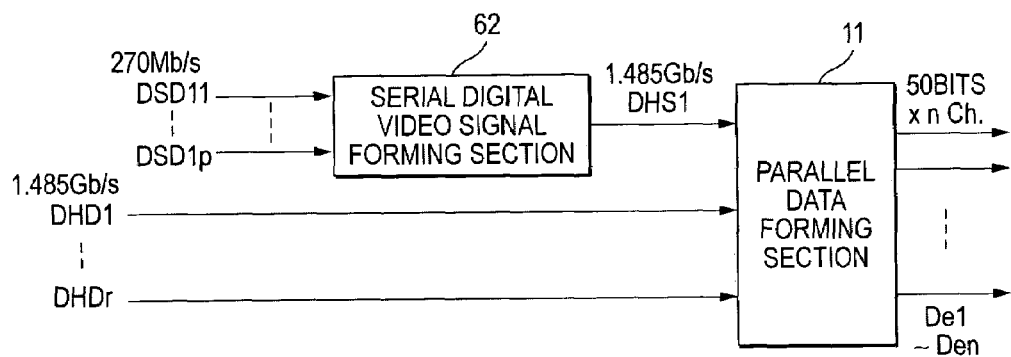
FIG. 11 is a block diagram which shows one example of a data transmitting apparatus described in an embodiment of the invention.

FIG. 11 shows one example (embodiment 5) of a data transmitting apparatus according to an embodiment of the invention.

In the example, a portion of which is shown in FIG. 11, i.e., in the embodiment 5, on an input terminal side of a parallel data forming section 11 which is to be the same as the parallel data forming section 11 shown in FIG. 1, 1 piece of a serial digital video signal forming section 62 is provided. To the serial digital video signal forming section 62, SD signals DSD11 to DSD1p of p channels, for example, 4 channels, in each of which a bit rate is set to standardized 270 Mb/s, are supplied as serial digital video signals of p channels forming bit string data each of which has a lower bit rate defined by a standard than a bit rate of HD-SDI signals in which a bit rate is to be set to standardized 1.485 Gb/s. Each of these SD signals DSD11 to DSD1p is to be obtained as a result of serialization of a D1 signal in which, for example, a frame rate is set to 30 Hz or 25 Hz, and a line number in each frame is set to 525 lines or 625 lines, and a word bit number (quantifying bit number) is set to 10 bits, and which was configured by applying word multiplexing processing to a Y data series and a $C_B/C_R$ data series.

The serial digital video signal forming section 62 applies multiplexing processing which conforms to, for example, SMPTE 349M which was established by SMPTE, to SD signals DSD11 to DSD1p of p channels, and forms a HD-SDI signal DHS1 of 1 channel which is based on the SD signals DSD11 to DSD1p of p channels. By that means, from the serial digital video signal forming sections 62, the HD-SDI signals DHS1 of 1 channel is obtained, and it is supplied to the parallel data forming section 11. This HD-SDI signal DHS1 of 1 channel is also to be obtained by serialization of HD signals in which, for example, a frame rate is set to 30 Hz or 25 Hz, and an all line number in each frame and an all sample number in each line are set to 525 lines and 4719 samples, or 625 lines and 4752 samples, respectively, and a word bit number (quantifying bit number) is set to 10 bits, and a data format is set to a Y, $C_B/C_R$ format.

In addition, to the parallel data forming section 11, HD-SDI signals DHD1 to DHDr of r channels, for example, 4 channels, each of which is to have a bit rate of standardized 1.485 Gb/s are supplied. Each of the suchlike HD-SDI signals DHD1 to DHDr of r channels is also to be equivalent to ones which are obtained as a result of serialization of HD signals in which, for example, a frame rate is set to 30 Hz, 25 Hz or 24 Hz, and an effective line number in each frame and an effective word number in each line are set to 1080 lines and 1920 words, and a word bit number (quantifying bit number) is set to 10 bits, and a data format is set to a Y, $C_B/C_R$ format.

As a result of that, to the parallel data forming section 11, HD-SDI signals DHS1 and DHD1 to DHDr of n channels, for example, 5 channels, in total of a HD-SDI signal DHS1 of 1 channel from the serial digital video signal forming sections 62 and HD-SDI signals DHD1 to DHDr of r channels, are to be supplied. Then, such the parallel data forming section 11 shown in FIG. 11 also incorporates n pieces of data processing sections to the HD-SDI signals DHS1 and DHD1 to DHDr of n channels, which correspond to the data processing sections PD1, PD2, . . . , PDn in the parallel data forming section 11 shown in FIG. 1.

Then, portions a part of which is omitted to be illustrated in the embodiment 5 shown in FIG. 11 are to be similar to corresponding portions in the embodiment 1 shown in FIG. 1.

In the suchlike embodiment 5 shown in FIG. 11 which is one example of a data transmitting apparatus of the invention, after multiplexing processing was applied to HD-SDI signals DHS1 and DHD1 to DHDr of n channels, for example, 5 channels, which are based on SD signals DSD11 to DSD1p of p channel, for example, 4 channel, and HD-SDI signals DHD1 to DHDr of r channels, for example, 4 channels, they can be converted into bit string data DTG in which a bit rate is set to 10 Gb/s or more, for example, 10.692 Gb/s, and sent away so as to transmit it. Therefore, it becomes possible to realize serial transmission as to SD signals and HD-SDI signals of multiple channels under such a basis that multiplexing processing was applied to them, as one which is available for practical use.

Embodiment 6

Figure 12:
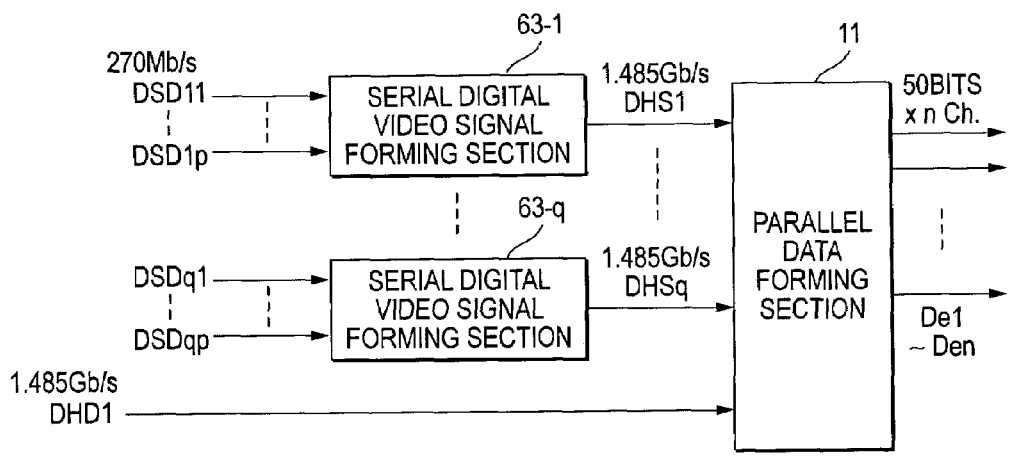
FIG. 12 is a block diagram which shows one example of a data transmitting apparatus described in an embodiment of the invention.

FIG. 12 shows one example (embodiment 6) of a data transmitting apparatus according to an embodiment of the invention.

In the example a part of which is shown in FIG. 12, i.e., in the embodiment 6, on an input terminal side of a parallel data forming section 11 which is to be the same as the parallel data forming section 11 shown in FIG. 1, q pieces, for example, 4 pieces of serial digital video signal forming sections 63-1 to 63-q are provided. To the serial digital video signal forming section 63-1, SD signals DSD11 to DSD1p of p channels, for example, 4 channels, in each of which a bit rate is set to standardized 270 Mb/s, are supplied as serial digital video signals of p channels forming bit string data each of which has a lower bit rate defined by a standard than a bit rate of HD-SDI signals in which a bit rate is to be set to standardized 1.485 Gb/s, . . . , and, to the serial digital video signal forming section 63-q, SD signals DSDq1 to DSDqp of p channels, for example, 4 channels, in each of which a bit rate is set to standardized 270 Mb/s, are supplied as serial digital video signals of p channels forming bit string data each of which has a lower bit rate defined by a standard than a bit rate of HD-SDI signals.

In this manner, to q pieces of the serial digital video signal forming sections 63-1 to 63-q, SD signals DSD11 to DSD1p, . . . , DSDq1 to DSDqp of p×q channels, for example, 16 channels are supplied. Each of these SD signals DSD11 to DSD1p, . . . , DSDq1 to DSDqp are to be obtained as a result of serialization of D1 signals in which, for example, a frame rate is set to 30 Hz or 25 Hz, and a line number in each frame is set to 525 lines or 625 lines, and a word bit number (quantifying bit number) is set to 10 bits, and which was configured by applying word multiplexing processing to a Y data series and a $C_B/C_R$ data series.

Then, the serial digital video signal forming section 63-1 applies multiplexing processing which conforms to, for example, SMPTE 349M which was established by SMPTE, to SD signals DSD11 to DSD1p of p channels, and forms a HD-SDI signal DHS1 of 1 channel which is based on the SD signals DSD11 to DSD1p of p channels, . . . , and the serial digital video signal forming section 63-q applies multiplexing processing which conforms to, for example, SMPTE 349M which was established by SMPTE, to SD signals DSDq1 to DSDqp of p channels, and forms a HD-SDI signal DHSq of 1 channel which is based on the SD signals DSDq1 to DSDqp of p channels.

As a result of that, from q pieces of the serial digital video signal forming sections 63-1 to 63-q, HD-SDI signals DHS1 to DHSq of q channels, for example, 4 channels are obtained, and they are supplied to the parallel data forming section 11. Each of these HD-SDI signals DHS1 to DHSq of q channels is also to be obtained by serialization of HD signals in which, for example, a frame rate is set to 30 Hz or 25 Hz, and an all line number in each frame and an all sample number in each line are set to 525 lines and 4719 samples, or 625 lines and 4752 samples, respectively, and a word bit number (quantifying bit number) is set to 10 bits, and a data format is set to a Y, $C_B/C_R$ format.

In addition, to the parallel data forming section 11, a HD-SDI signals DHD1 of 1 channel, which is to have a bit rate of standardized 1.485 Gb/s, is supplied. This HD-SDI signal DHD1 of 1 channel is also to be equivalent to one which is obtained as a result of serialization of HD signals in which, for example, a frame rate is set to 30 Hz, 25 Hz or 24 Hz, and an effective line number in each frame and an effective word number in each line are set to 1080 lines and 1920 words, and a word bit number (quantifying bit number) is set to 10 bits, and a data format is set to a Y, $C_B/C_R$ format.

As a result of that, to the parallel data forming section 11, HD-SDI signals DHS1 to DHSq and DHD1 of n channels, for example, 5 channels in total of HD-SDI signals DHS1 to DHSq of q channels from q pieces of the serial digital video signal forming sections 63-1 to 63-q and the HD-SDI signal DHD1 of 1 channel, are to be supplied. Then, such the parallel data forming section 11 shown in FIG. 12 also incorporates n pieces of data processing sections to the HD-SDI signals DHS1 to DHSq and DHD1 of n channels, which correspond to the data processing sections PD1, PD2, . . . , PDn in the parallel data forming section 11 shown in FIG. 1.

Then, portions a part of which is omitted to be illustrated in the embodiment 6 shown in FIG. 12 are to be similar to corresponding portions in the first example shown in FIG. 1.

In the suchlike embodiment 6 shown in FIG. 12 which is one example of a data transmitting apparatus of the invention, after multiplexing processing was applied to HD-SDI signals DHS1 to DHSq and DHD1 of n channels, for example, 5 channels, which are based on SD signals DSD11 to DSD1p, . . . , DSDq1 to DSDqp of p×q channels, for example, 16 channels and HD-SDI signals DHD1 of 1 channel, they can be converted into bit string data DTG in which a bit rate is set to 10 Gb/s or more, for example, 10.692 Gb/s, and sent away so as to transmit it. Therefore, it becomes possible to realize serial transmission as to SD signals and HD-SDI signals of multiple channels under such a basis that multiplexing processing was applied to them, as one which is available for practical use.

Embodiment 7

Figure 13:
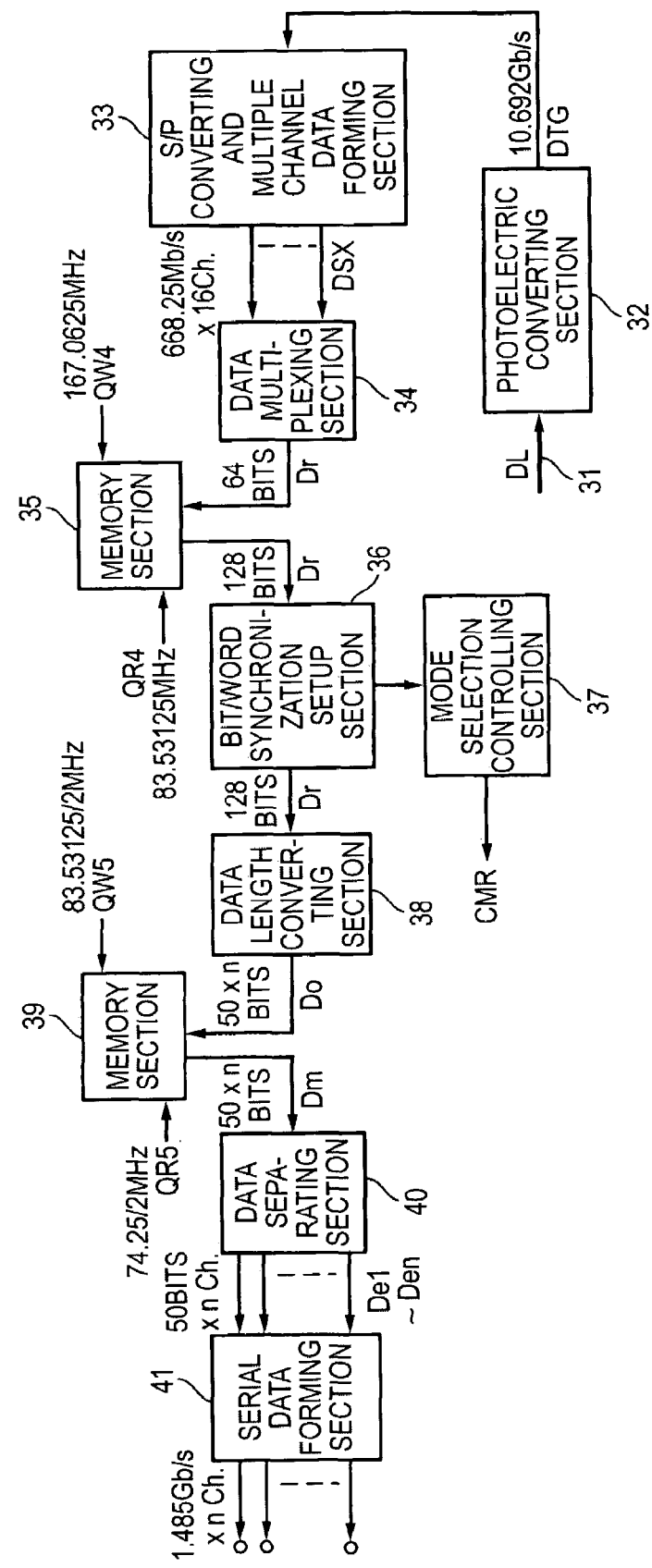
FIG. 13 is a block diagram which shows one example of a data receiving apparatus described in an embodiment of the invention.

FIG. 13 shows one example (embodiment 7) of a data receiving apparatus of the invention.

In the example shown in FIG. 13, i.e., in the embodiment 7, an optical signal DL, which comes through an optical signal transmission cable 31 formed by an optical fiber etc., is received by a photoelectric converting section 32 which forms a data receiving section. The optical signal DL is to correspond to the optical signal DL which is sent away so as to be transmitted in the embodiment 1 shown in FIG. 1, and which is obtained by conversion of bit string data DTG in which a bit rate is to be 10 Gb/s or more, for example, 10.692 Gb/s.

The photoelectric converting section 32 converts the optical signal DL into bit string data DTG in which a bit rate is set to 10 Gb/s or more, for example, 10.692 Gb/s. and supplies the bit string data DTG to a S/P converting and multiple channel data forming section 33. the S/P converting and multiple channel data forming section 33 applies S/P conversion to the bit string data DTG, and forms bit string data DSX of m channels (m is an integer of 3 or more), for example, 16 channels, in each of which a bit rate is to be set to, for example, 668.25 Mb/s. By that means, the bit string data DSX of 16 channels, which are obtained from the S/P converting and multiple channel data forming section 33, is supplied to a data multiplexing section 34.

The data multiplexing section 34 multiplexes the bit string data DSX of 16 channels, and forms word string data Dq which is to be multiplex word string data. By that means, the word string data Dq, which is obtained from the data multiplexing section 34, is written in a memory section 35, by 64 bits thereof at a time, with a writing clock signal QW4 in which frequency is set to 167.0625 MHz. Then, the word string data Dq, which was written in the memory section 35, is read out from the memory section 35, by 128 bits at a time, with a reading clock signal QR4 in which frequency is set to 83.53125 MHz, and supplied to a bit/word synchronization setup section 36 as word string data Dr.

In this manner, the word string data Dr, which is supplied to the bit/word synchronization setup section 36, is to take a line portion data structure as shown in, for example, A, B or C of FIG. 6, or A, B or C of FIG. 7. Then, in the bit/word synchronization setup section 36, detection of "K28.5" of successive 2 bytes, which is included in the word string data Dr, is carried out, and on the basis of its detection result, bit synchronization and word synchronization are established. In addition, a mode selection controlling section 37, which was disposed in the bit/word synchronization setup section 36, detects identification data: Payload Id which is included in word string data Dr, and detects a data content of the word string data Dr, and sends away a mode selection control signal CMR for having an entirety of the example shown in FIG. 13 taken a data processing mode which corresponds to the detected data content. As a result of that, the example shown in FIG. 13 is to take a data processing mode which fits in with a data content of the word string data Dr, across its entirety.

The word string data Dr, which passed through the bit/word synchronization setup section 36, is supplied to a data length converting section 38. In the data length converting section 38, to the word string data Dr, data length conversion processing for converting 128 bits thereof into 50×n bits (n is an integer of 2 or more, which is smaller than m) is applied, to form word string data Do. On that occasion, in case that additional data, which was added at the time of transmission, is included in the word string data Dr, the additional data is removed.

Then, the word string data Do, which is obtained from the data length converting section 38, is written in a memory section 39, by 50×n bits thereof at a time, with a writing clock signal QW5 in which frequency is set to 83.53125/2 MHz≈41.766 MHz. Then, the word string data Do, which was written in the memory section 39, is read out by 50×n bits at a time, with a reading clock signal QR5 in which frequency is set to 74.25/2 MHz=37.125 MHz, and supplied to a data separating section 40 as multiplex word string data Dm.

In the data separating section 40, word separation processing is applied to the multiplex word string data Dm, and word string data De1 to Den of n channels are separated and taken out from the multiplex word string data Dm. As to these word string data De1 to Den of n channels, which are separated in the data separating section 40, each of them is to be sent away from the data separating section 40, by 50 bits at a time, and supplied to a serial data forming section 41.

Figure 14:
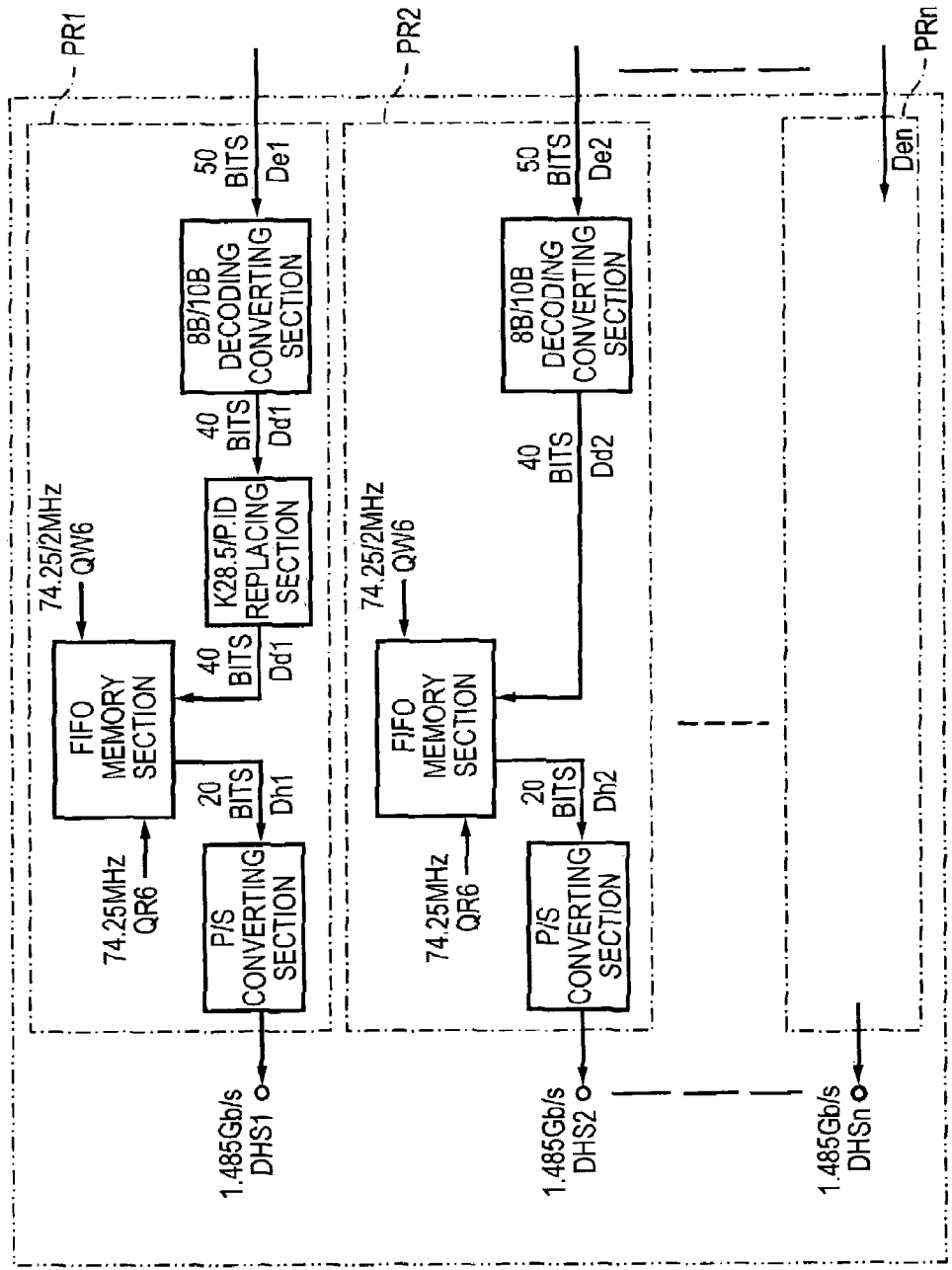
FIG. 14 is a block diagram which shows a concrete configuration example of a serial data forming section in the example shown in FIG. 13.

The serial data forming section 41 incorporates, as shown in FIG. 14, a data processing section PR1 to the word string data De1, a data processing section PR2 to the word string data De2, . . . , a data processing section PRn to the word string data Den.

In the data processing section PR1, to the word string data De1 which is applied thereto, 8B/10B decoding conversion, by which 50 bits thereof are converted into 40 bits sequentially, is applied, in an 8B/10B decoding converting section 42, and word string data Dd1 is formed. Then, the word string data Dd1, which is obtained from the 8B/10B decoding converting section 42, is supplied to a K.28.5/P.ID replacing section 43.

In the K28.5/P.ID replacing section 43, it carries out data replacement processing for replacing 8 bit word data which was inserted into the front of each line blanking portion of the word string data Dd1 and becomes "K28.5" when 8B/10B conversion processing of 2 bytes is carried out, and 8 bit word data which becomes identification data: Payload ID when 8B/10B conversion processing of 3 bytes is carried out, with 4 words (3FF(Y), 3FF(C), 000(Y), 000(C)) which configures timing reference code data EAV.

From the K28.5/P.ID replacing section 43, the word string data Dd1, in which the front of each line blanking portion was replaced with 4 words which configure timing reference code SAV or EAV, is sent away by 40 bits at a time, and the word string data Dd1 is written in a FIFO memory section 44, by 40 bits at a time, with a writing clock signal QW6 in which frequency is set to 74.25/2 MHz=37.125 MHz. Subsequently, the word string data Dd1, which was written in the FIFO memory section 44, is read out by 20 bits at a time, with a reading clock signal QR6 in which frequency is set to 74.25 MHz, and word string data Dh1, which forms a HD signal as a parallel digital video signal with a 20 bit word structure, is formed, and the word string data Dh1 is supplied to a P/S converting section 45. This word string data Dh1 is to have a line portion data structure as shown in, for example, FIG. 3.

In the P/S converting section 45, P/S conversion is applied to the word string data Dh1, to form a HD-SDI signal DHS1 which is based on the word string data Dh1 and which is a serial digital video signal in which a bit rate is set to standardized 1.485 Gb/s. Then, the HD-SDI signal DHS1, which is formed in this P/S converting section 45, is used as output data from the data processing section PR1.

In addition, in the data processing section PR2, to the word string data De2 which is applied thereto, 8B/10B decoding conversion, by which 50 bits thereof are converted into 40 bits sequentially, is applied, in an 8B/10B decoding converting section 46, and word string data Dd2 is formed. Then, the word string data Dd2, which is obtained from the 8B/10B decoding converting section 46, is written in a FIFO memory section 47, by 40 bits at a time, with a writing clock signal QW6 in which frequency is set to 74.25/2 MHz=37.125 MHz.

Subsequently, the word string data Dd2, which was written in the FIFO memory section 47, is read out by 20 bits at a time, with a reading clock signal QR6 in which frequency is set to 74.25 MHz, and word string data Dh2, which forms a HD signal as a parallel digital video signal with a 20 bit word structure, is formed, and the word string data Dh2 is supplied to a P/S converting section 48. This word string data Dh2 is to also have a line portion data structure as shown in, for example, FIG. 3.

In the P/S converting section 48, P/S conversion is applied to the word string data Dh2, to form a HD-SDI signal DHS2 which is based on the word string data Dh2 and which is a serial digital video signal in which a bit rate is set to standardized 1.485 Gb/s. Then, the HD-SDI signal DHS2, which is formed in this P/S converting section 48, is used as output data from the data processing section PR2.

Each of the data processing sections PR3 to PRn is also the same as the data processing section PR2, and in the data processing sections PR3 to PRn, the same processing as processing which is carried out to the word string data De2 to be supplied to the data processing section PR2 is carried out to word string data De3 to Den which are supplied to them, respectively, and from the data processing sections PR3 to PRn, HD-SDI signals DHS3 to DHSn, which are serial digital video signals in each of which a bit rate is set to standardized 1.485 Gb/s, are obtained as output data.

In this manner, the HD-SDI signals DHS1 to DHSn of n channels, which are obtained from each of the data processing sections PR1 to PRn as output data, are sent away from a serial data forming section 41 as reproduced HD-SDI signals.

As described above, in the embodiment 7 which is one example of a data receiving apparatus of the invention, it can receive bit string data DTG in which, for example, a bit rate is set to 10 Gb/s or more, for example, 10.692 Gb/s, and reproduce HD-SDI signals DHS1 to DHSn of n channels, which are serial digital video signals of n channels forming bit string data each of which has a bit rate defined by a standard, from the received bit string data DTG. Therefore, on the occasion of serial transmission of HD-SDI signals having a bit rate which is to be standardized 1.485 Gb/sit under such a basis that multiple channels thereof were multiplexed, it becomes possible to configure that receiving side apparatus.

Embodiment 8

Figure 15:
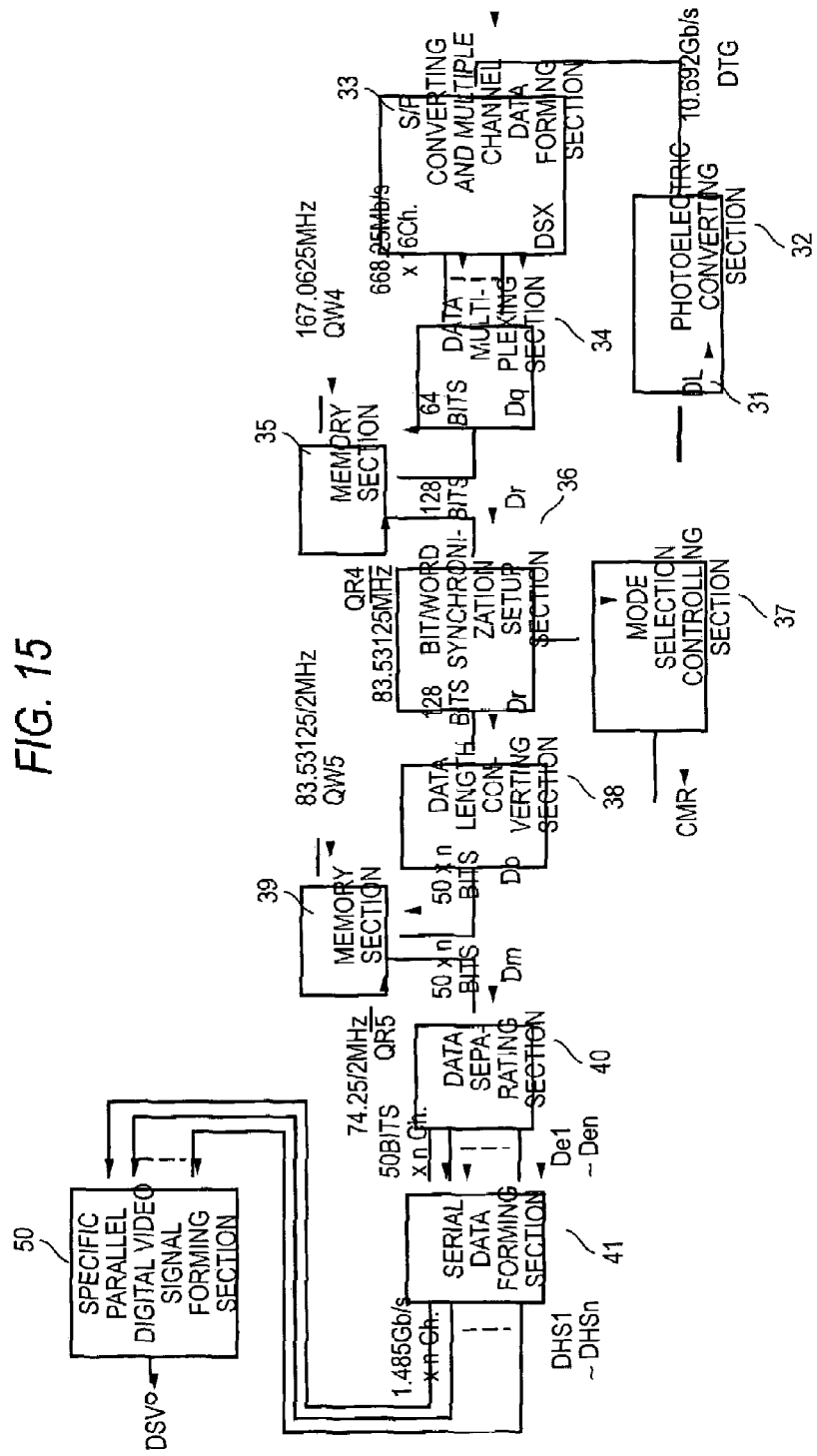
FIG. 15 is a block diagram which shows one example of a data receiving apparatus described in an embodiment of the invention.

FIG. 15 shows one example (embodiment 8) of a data receiving apparatus of the invention.

In the example shown in FIG. 15, i.e., in the embodiment 8, on an output terminal side of a serial data forming section 41 which is to be the same as the serial data forming section 41 shown in FIG. 13, a specific digital video signal forming section 50 is provided. To the specific parallel digital video signal forming section 50, HD-SDI signals DHS1 to DHSn of n channels, which are obtained from the serial data forming section 41, are supplied. On such occasion, the HD-SDI signals DHS1 to DHSn of n channels, which are obtained from the serial data forming section 41, are ones which were formed by applying conversion processing to specific parallel digital video signals which are to be any one of next generation camera signals, HD super motion signals, 4 k×2 k signals etc., and which form word string data configured with a specific frame rate, a quantifying bit number, and parallel arrangement of green color, blue color and red color original color signal data series.

In the specific parallel digital video signal forming section 50, the HD-SDI signals DHS1 to DHSn of n channels are converted into specific parallel digital video signals DSV which are to be any one of next generation camera signals, HD super promotion signals, 4 k×2 k signals etc., under such a basis that auxiliary bit is removed in case that there is the auxiliary bit which was added on the occasion of conversion from specific parallel digital video signals. By that means, from the specific parallel digital video signal forming section 50, the specific parallel digital video signals DSV, which are to be any one of next generation camera signals, HD super promotion signals, 4 k×2 k signals etc. which were reproduced on the basis of bit string data DTG in which a bit rate is set to 10 Gb/s or more, for example, 10.692 Gb/s, are sent away.

Other portions in the embodiment 8 shown in FIG. 15 are similar to corresponding portions in the embodiment 7 shown in FIG. 13, and therefore, blocks and signals or data in FIG. 15, which correspond to block and signals or data shown in FIG. 13, are described with reference numerals and signs which are shared with FIG. 13, so that overlapped explanations will be omitted.

In the suchlike embodiment 8 shown in FIG. 15 which is one example of a data receiving apparatus of the invention, it can receive bit string data DTG in which, for example, a bit rate is set to 10 Gb/s or more, for example, 10.692 Gb/s, and reproduce the specific parallel digital video signals DSV which are to be any one of next generation camera signals, HD super promotion signals, 4 k×2 k signals etc. and which form word string data configured with a specific frame rate, a quantifying bit number, and parallel arrangement of green color, blue color and red color original color signal data series. Therefore, on the occasion of serial transmission as to any one of next generation camera signals, HD super promotion signals, 4 k×2 k signals etc., it becomes possible to configure that receiving apparatus.

Embodiment 9

Figure 16:
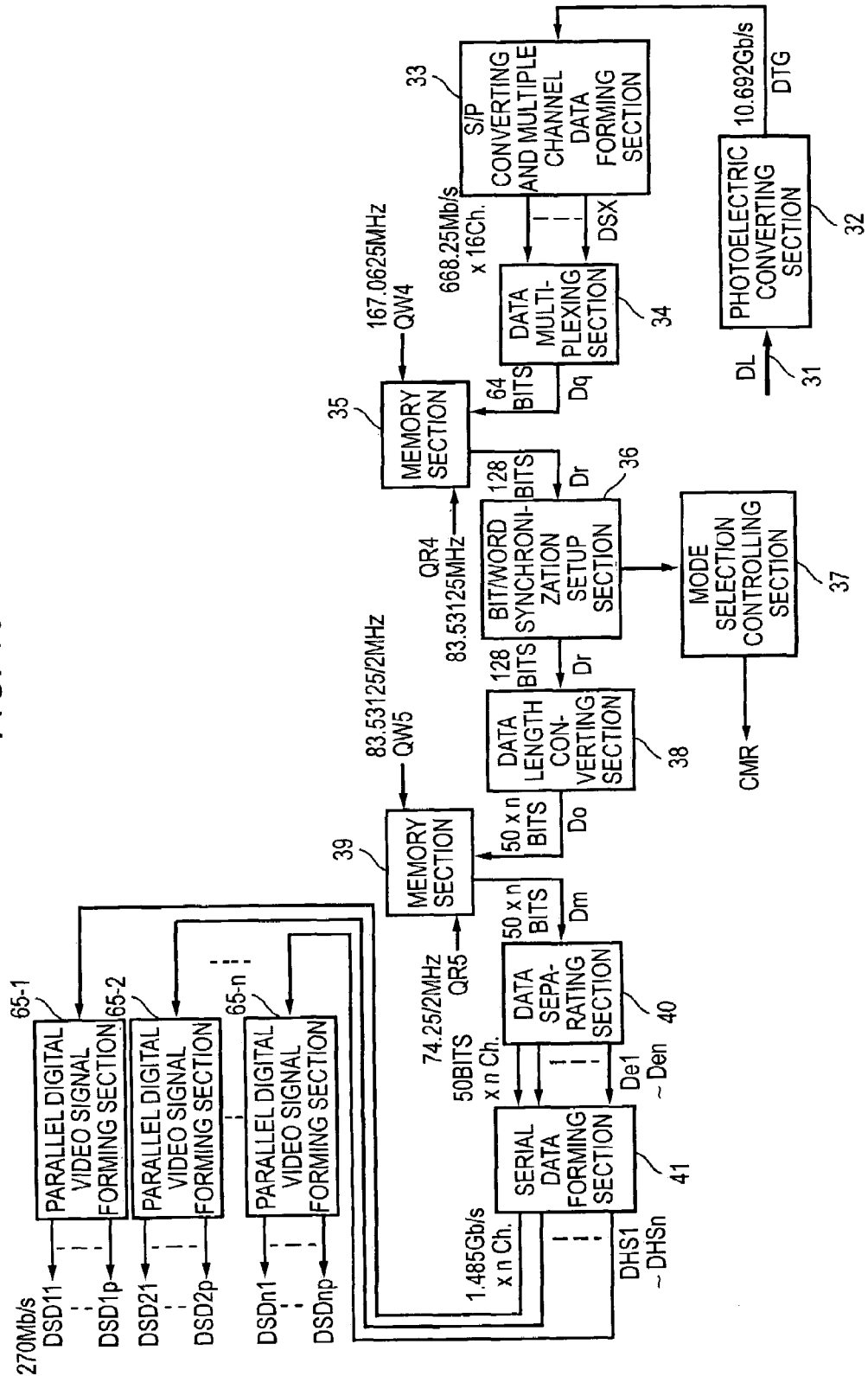
FIG. 16 is a block diagram which shows one example of a data receiving apparatus described in an embodiment of the invention.

FIG. 16 shows one example (embodiment 9) of a data receiving apparatus of the invention.

In the example shown in FIG. 16, i.e., in the embodiment 9, on an output terminal side of a serial data forming section 41 which is to be the same as the serial data forming section 41 shown in FIG. 13, n pieces, for example, 5 pieces or 6 pieces of parallel digital video signal forming sections 65-1, 65-2, . . . , 65-*n* are provided. To the parallel digital video signal forming sections 65-1 to 65-*n*, HD-SDI signals DHS1 to DHSn of n channels, which are obtained from the serial data forming section 41, are supplied. On such occasion, the HD-SDI signals DHS1 to DHSn of n channels, which are obtained from the serial data forming section 41, are to be ones which were formed by applying conversion processing to SD signals of multiple channels, which are serial digital video signals forming bit string data each of which has a lower bit rate defined by a standard than a bit rate of HD-SDI signals.

In the parallel digital video signal forming section 65-1, processing, which is opposite to multiplexing processing which conforms to, for example, SMPTE 349M established by SMPTE, for forming HD-SDI signals as to SD signals of multiple channels, is applied to to the HD-SDI signal DHS1, and it is converted into SD signals DSD11 to DSD1*p* of p channels, for example, 4 channels, which are based on the HD-SDI signal DHS1, and are serial digital video signals forming bit string data each of which has a lower bit rate defined by a standard than a bit rate of HD-SDI signals. In the same manner, in the parallel digital video signal forming section 65-2, processing, which is opposite to multiplexing processing which conforms to, for example, SMPTE 349M established by SMPTE, for forming HD-SDI signals as to SD signals of multiple channels, is applied to the HD-SDI signal DHS2, and it is converted into SD signals DSD21 to DSD2*p* of p channels, for example, 4 channels, which are based on the HD-SDI signal DHS2, . . . , and in the parallel digital video signal forming section 65-*n*, processing, which is opposite to multiplexing processing which conforms to, for example, SMPTE 349M established by SMPTE, for forming HD-SDI signals as to SD signals of multiple channels, is applied to the HD-SDI signal DHSn, and it is converted into SD signals DSDn1 to DSDnp of p channels, for example, 4 channels, which are based on the HD-SDI signal DHSn.

By that means, from n pieces of the parallel digital video signal forming sections 65-1, 65-2, . . . , 65-*n*, SD signals DSD11 to DSD1*p*, DSD21 to DSD2*p*, . . . , DSDn1 to DSDnp of n×p channels, for example 20 channels or 24 channels, in each of which, for example, a bit rate is set to standardized 270 Mb/s, are sent away.

Other portions in the embodiment 9 shown in FIG. 16 are similar to corresponding portions in the embodiment 7 shown in FIG. 13, and therefore, blocks and signals or data in FIG. 16, which correspond to block and signals or data shown in FIG. 13, are described with reference numerals and signs which are shared with FIG. 13, so that overlapped explanations will be omitted.

In the suchlike embodiment 9 shown in FIG. 16 which is one example of a data receiving apparatus of the invention, it can receive bit string data DTG in which, for example, a bit rate is set to 10 Gb/s or more, for example, 10.692 Gb/s, and reproduce SD signals of for example, 20 channels or 24 channels, which are serial digital video signal forming bit string data each of which has a lower bit rate defined by a standard than a bit rate of HD-SDI signals, from the received bit string data DTG. Therefore, on the occasion of serial transmission as to SD signals of multiple channels under such a basis that they were multiplexed, it becomes possible to configure that receiving apparatus.

Embodiment 10

Figure 17:
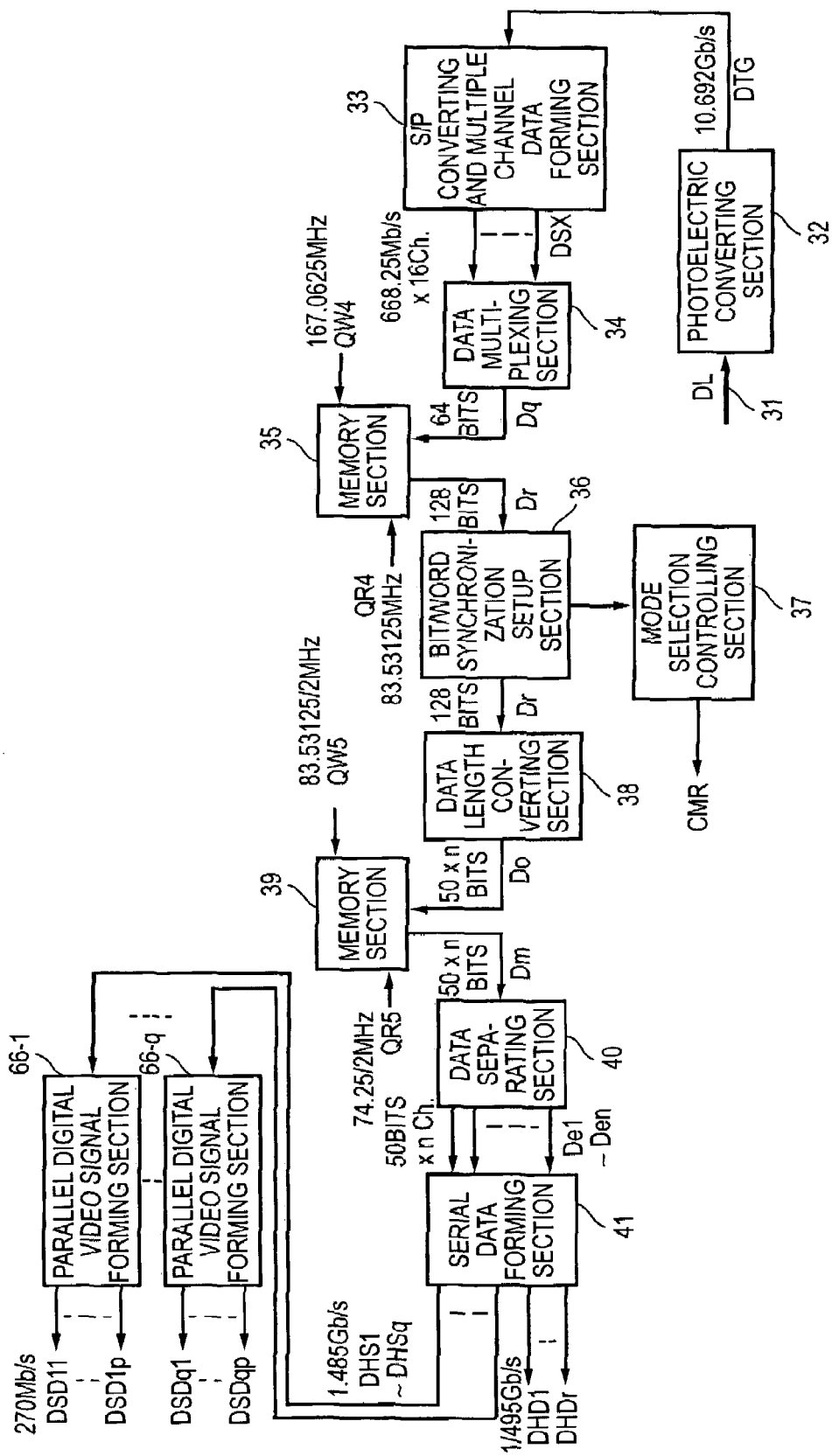
FIG. 17 is a block diagram which shows one example of a data receiving apparatus described in an embodiment of the invention.

FIG. 17 shows one example (embodiment 10) of a data receiving apparatus of the invention.

In the example shown in FIG. 17, i.e., in the embodiment 10, on an output terminal side of a serial data forming section 41 which is to be the same as the serial data forming section 41 shown in FIG. 13, q pieces, for example, 3 pieces or 2 pieces of parallel digital video signal forming sections 66-1 to 66-*q* are provided. To the parallel digital video signal forming sections 66-1 to 66-*q*, HD-SDI signals DHS1 to DHSq of q channels, out of HD-SDI signals of n channels, for example, 5 channels, which are obtained from the serial data forming section 41, are supplied, respectively. On such occasion, the HD-SDI signals DHS1 to DHSq of q channels, which are obtained from the serial data forming section 41, are to be ones which were formed by applying conversion processing to SD signals of multiple channels, which are serial digital video signals forming bit string data each of which has a lower bit rate defined by a standard than a bit rate of HD-SDI signals.

In the parallel digital video signal forming section 66-1, processing, which is opposite to multiplexing processing which conforms to, for example, SMPTE 349M established by SMPTE, for forming HD-SDI signals as to SD signals of multiple channels, is applied to the HD-SDI signal DHS1, and it is converted into SD signals DSDL1 to DSD1*p* of p channels, for example, 4 channels, which are based on the HD-SDI signal DHS1, and are serial digital video signals forming bit string data each of which has a lower bit rate defined by a standard than a bit rate of HD-SDI signals, . . . , and in the parallel digital video signal forming section 66-*q*, processing, which is opposite to multiplexing processing which conforms to, for example, SMPTE 349M established by SMPTE, for forming HD-SDI signals as to SD signals of multiple channels, is applied to the HD-SDI signal DHSq, and it is converted into SD signals DSDq1 to DSDqp of p channels, for example, 4 channels, which are based on the HD-SDI signal DHSq.

By that means, from q pieces of the parallel digital video signal forming sections 66-1 to 66-*q*, SD signals DSD11 to DSD1*p*, . . . , DSDq1 to DSDqp of q×p channels, for example 12 channels or 8 channels, in each of which, for example, a bit rate is set to standardized 270 Mb/s, are sent away.

In addition, in the embodiment 10 shown in FIG. 17, from the serial data forming section 41, HD-SDI signals DHD1 to DHDr of r (=n−q) channels, for example, 2 channels or 3 channels, out of HD-SDI signals of n channels, for example, 5 channels, which are obtained therein, are sent away. Each of these HD-SDI signals DHD1 to DHDr of r (=n−q) channels are to be ones in which a bit rate is set to standardized 1.485 Gb/s.

Therefore, in the embodiment 10 shown in FIG. 17, on the basis of HD-SDI signals of n channels, for example, 5 channels, which are obtained from the serial data forming section 41, SD signals DSD11 to DSD1*p*, . . . , DSDq1 to DSDqp of q×p channels, for example, 12 channels or 8 channels, and HD-SDI signals DHS1 to DHDr of r (=n−q) channels, for example, 2 channels or 3 channels, are to be reproduced and sent away.

Other portions in the embodiment 10 shown in FIG. 17 are similar to corresponding portions in the embodiment 7 shown in FIG. 13, and therefore, blocks and signals or data in FIG. 17, which correspond to block and signals or data shown in FIG. 13, are described with reference numerals and signs which are shared with FIG. 13, so that overlapped explanations will be omitted.

In the suchlike embodiment 10 shown in FIG. 17 which is one example of a data receiving apparatus of the invention, it can receive bit string data DTG in which, for example, a bit rate is set to 10 Gb/s or more, for example, 10.692 Gb/s, and reproduce SD signals of for example, 12 channels or 8 channels, which are serial digital video signal forming bit string data each of which has a lower bit rate defined by a standard than a bit rate of HD-SDI signals, and HD-SDI signals of multiple channels, for example, 2 channels or 3 channels, from the received bit string data DTG. Therefore, on the occasion of serial transmission as to SD signals and HD-SDI signals of multiple channels under such a basis that they were mixed and multiplexed, it becomes possible to configure that receiving apparatus.

Embodiment 11

Figure 18:
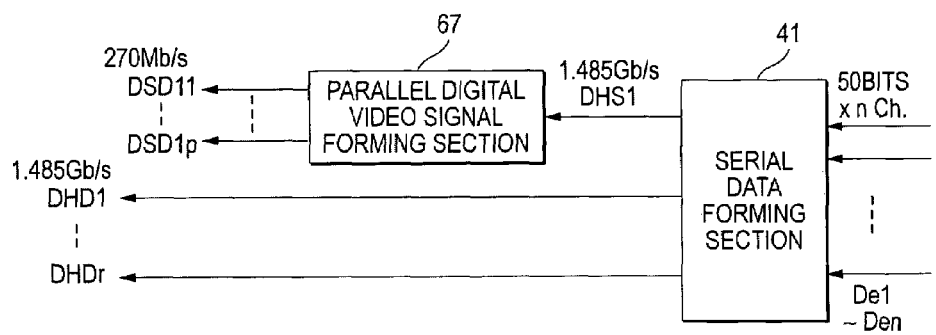
FIG. 18 is a block diagram which shows a portion of one example of a data receiving apparatus described in an embodiment of the invention.

FIG. 18 shows one example (embodiment 11) of a data receiving apparatus of the invention.

In the example a part of which is shown in FIG. 18, i.e., in the embodiment 11, on an output terminal side of a serial data forming section 41 which is to be the same as the serial data forming section 41 shown in FIG. 13, 1 piece of a parallel digital video signal forming section 67 provided. To the parallel digital video signal forming section 67, a HD-SDI signal DHS1 of 1 channel, out of HD-SDI signals of n channels, for example, 5 channels, which are obtained from the serial data forming section 41, is supplied. On such occasion, the HD-SDI signal DHS1 of 1 channel, which is obtained from the serial data forming section 41, is to be one which was formed by applying conversion processing to SD signals of multiple channels, which are serial digital video signals forming bit string data each of which has a lower bit rate defined by a standard than a bit rate of HD-SDI signals.

In the parallel digital video signal forming section 67, processing, which is opposite to multiplexing processing which conforms to, for example, SMPTE 349M established by SMPTE, for forming HD-SDI signals as to SD signals of multiple channels, is applied to the HD-SDI signal DHS1, and it is converted into SD signals DSD11 to DSD1$p$ of p channels, for example, 4 channels, which are based on the HD-SDI signal DHS1, and are serial digital video signals forming bit string data each of which has a lower bit rate defined by a standard than a bit rate of HD-SDI signals. By that means, from the parallel digital video signal forming section 67, SD signals DSD11 to DSD1$p$ of p channels, for example, 4 channels, in each of which, for example, a bit rate is set to standardized 270 Mb/s, are sent away.

In addition, in the embodiment 11 shown in FIG. 18, from the serial data forming section 41, HD-SDI signals DHD1 to DHDr of r channels, for example, 4 channels, out of HD-SDI signals of n channels, for example, 5 channels, which are obtained therein, are sent away. Each of these HD-SDI signals DHD1 to DHDr of r channels are to be ones in which a bit rate is set to standardized 1.485 Gb/s.

Therefore, in the embodiment 11 shown in FIG. 18, on the basis of HD-SDI signals of n channels, for example, 5 channels, which are obtained from the serial data forming section 41, SD signals DSD11 to DSD1$p$ of p channels, for example, 4 channels, and HD-SDI signals DHD1 to DHDr of r channels, for example, 4 channels, are to be reproduced and sent away.

Portions, a part of which is omitted to be illustrated in the embodiment 11 shown in FIG. 18, are to be similar to corresponding portions in the embodiment 7 shown in FIG. 13.

In the suchlike embodiment 11 shown in FIG. 18 which is one example of a data receiving apparatus of the invention, it can receive bit string data DTG in which, for example, a bit rate is set to 10 Gb/s or more, for example, 10.692 Gb/s, and reproduce SD signals of for example, 4 channels, which are serial digital video signal forming bit string data each of which has a lower bit rate defined by a standard than a bit rate of HD-SDI signals, and HD-SDI signals of for example, 4 channels, from the received bit string data DTG. Therefore, on the occasion of serial transmission as to SD signals and HD-SDI signals of multiple channels under such a basis that they were mixed and multiplexed, it becomes possible to configure that receiving apparatus.

Embodiment 12

Figure 19:
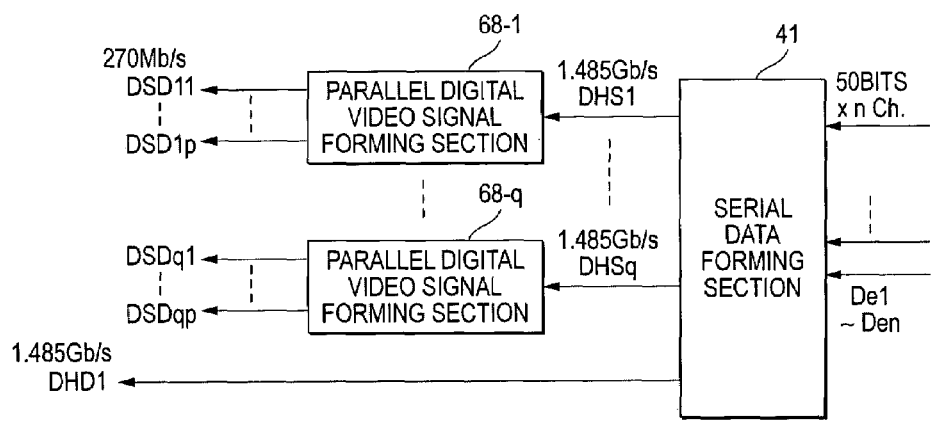
FIG. 19 is a block diagram which shows a portion of one example of a data receiving apparatus described in an embodiment of the invention.

FIG. 19 shows one example (embodiment 12) of a data receiving apparatus of the invention.

In the example a part of which is shown in FIG. 19, i.e., in the embodiment 12, on an output terminal side of a serial data forming section 41 which is to be the same as the serial data forming section 41 shown in FIG. 13, q pieces, for example, 4 pieces of parallel digital video signal forming sections 68-1 to 68-$q$ are provided. To the parallel digital video signal forming sections 68-1 to 68-$q$, HD-SDI signals DHS1 to DHSq of q channels, out of HD-SDI signals of n channels, for example, 5 channels, which are obtained from the serial data forming section 41, are supplied, respectively. On such occasion, the HD-SDI signals DHS1 to DHSq of q channels, which are obtained from the serial data forming section 41, are to be ones which were formed by applying conversion processing to SD signals of multiple channels, which are serial digital video signals forming bit string data each of which has a lower bit rate defined by a standard than a bit rate of HD-SDI signals.

In the parallel digital video signal forming section 68-1, processing, which is opposite to multiplexing processing which conforms to, for example, SMPTE 349M established by SMPTE, for forming HD-SDI signals as to SD signals of multiple channels, is applied to the HD-SDI signal DHS1, and it is converted into SD signals DSD11 to DSD1$p$ of p channels, for example, 4 channels, which are based on the HD-SDI signal DHS1, and are serial digital video signals forming bit string data each of which has a lower bit rate defined by a standard than a bit rate of HD-SDI signals, . . . , and in the parallel digital video signal forming section 68-$q$, processing, which is opposite to multiplexing processing which conforms to, for example, SMPTE 349M established by SMPTE, for forming HD-SDI signals as to SD signals of multiple channels, is applied to the HD-SDI signal DHSq, and it is converted into SD signals DSDq1 to DSDqp of p channels, for example, 4 channels, which are based on the HD-SDI signal DHSq.

By that means, from q pieces of the parallel digital video signal forming sections 68-1 to 68-$q$, SD signals DSD11 to DSD1$p$, . . . . . . , DSDq1 to DSDqp of q×p channels, for example 16 channels, in each of which, for example, a bit rate is set to standardized 270 Mb/s, are sent away.

In addition, in the embodiment 12 shown in FIG. 19, from the serial data forming section 41, a HD-SDI signal DHS1, out of DH-SDI signals of n channels, for example, 5 channels, which are obtained therein, is sent away. This HD-SDI signal DHD1 is to be one in which a bit rate is set to standardized 1.485 Gb/s.

Therefore, in the embodiment 12 shown in FIG. 19, on the basis of HD-SDI signals of n channels, for example, 5 channels, which are obtained from the serial data forming section 41, SD signals DSD11 to DSD1$p$, ..., DSDq1 to DSDqp of q×p channels, for example, 16 channels, and the HD-SDI signal DHD1 of 1 channel are to be reproduced and sent away.

Other portions in the embodiment 12 shown in FIG. 19 are similar to corresponding portions in the embodiment 7 shown in FIG. 13.

In the suchlike embodiment 12 shown in FIG. 19 which is one example of a data receiving apparatus of the invention, it can receive bit string data DTG in which, for example, a bit rate is set to 10 Gb/s or more, for example, 10.692 Gb/s, and reproduce SD signals of for example, 16 channels, which are serial digital video signal forming bit string data each of which has a lower bit rate defined by a standard than a bit rate of HD-SDI signals, and a HD-SDI signal of 1 channel, from the received bit string data DTG. Therefore, on the occasion of serial transmission as to SD signals of multiple channels and a HD-SDI signals under such a basis that they were mixed and multiplexed, it becomes possible to configure that receiving apparatus.

A data transmitting apparatus, which was described in any one of the above-described embodiment, and a data receiving apparatus, which was described in any one of the above-described embodiment, are ones which can be applied widely in the field of handling digital video signals, as ones which can establish a data transmission system which can carry out effective transmission as to multiple channels of standardized HD-SDI signals, and can also realize serial transmission as to each of next generation camera signals, HD super motion signals, 4 k×2 k signals etc. in the form which is available for practical use, and further, can practically carry out serial transmission as to SD signals of multiple channels, or SD signals and HD-SDI signals of multiple channels, under such a basis that multiplexing processing was applied to them.

It should be understood by those skilled in the art that various modifications, combinations, sub-combinations and alternations may occur depending on design requirements and other factors insofar as they are within the scope of the appended claims or the equivalents thereof.

What is claimed is:

1. A data transmitting apparatus comprising:
   a plurality of serial/parallel converting means to which first serial digital video signals of n channels, where n is an integer of 2 or more, forming bit string data, each of which has a bit rate defined by a standard, are supplied, to obtain first word string data of n channels forming a parallel digital video signal, each of which has a line portion data structure defined by a standard;
   a plurality of 8 bit/10 bit converting means to which the first word string data of n channels, which is obtained from the plurality of serial/parallel converting means, is supplied, to apply 8 bit/10 bit converting processing to each of the first word string data of n channels by a first predetermined bit number at a time, and to form second word string data of n channels, each of which has a predetermined word bit number;
   data multiplexing means which multiplexes the second word string data of n channels which is obtained from the plurality of 8 bit/10 bit converting means, to form multiplex word string data;
   data length converting means for converting the formed multiplex word string data to a sequential data string having additional data utilized for speed adjustment;
   multiple channel data forming means which takes out the converted multiplex word string data which is obtained from the data multiplexing means, by a second predetermined bit number at a time, to form bit string data of m channels (m is an integer which is larger than n), each of which has a predetermine bit rate;
   data multiplexing and parallel/serial converting means which multiplexes bit string data of m channels, which is obtained from the multiple channel data forming means and also applies parallel/serial conversion thereto, to form bit string data in which a data rate is 10 Gb/s or more, as a second serial/digital video signal; and
   data sending away means which sends away to transmit bit string data which is obtained from the data multiplexing and parallel/serial converting means and in which a data rate is 10 Gb/s or more.

2. The data transmitting apparatus as set forth in claim 1, further comprising:
   data inserting means which replaces word synchronous data and identification word data, which were defined in advance, to insert the identification word data into one of the first word string data of n channels which is obtained from said plurality of serial/parallel converting means.

3. The data transmitting apparatus as set forth in claim 1, further comprising:
   a plurality of memory means, in each of which, any one of the first word string data of n channel, which is obtained from said plurality of serial/parallel converting means, is written, and the written first word string data is read out by said first predetermined bit number at a time.

4. The data transmitting apparatus as set forth in claim 1, further comprising:
   memory means in which the multiplex word string data, which is obtained from said data multiplexing means, is written with a writing clock signal having first frequency, and is read out with a reading clock signal having second frequency which is different from said first frequency, and is sent to said multiple channel data forming means.

5. The data transmitting apparatus as set forth in claim 1, wherein said data sending away means converts the bit string data which is obtained from said data multiplexing and parallel/serial converting means and in which a data rate is 10 Gb/s or more, into an optical signal, and sends the converted bit string data out to an optical signal transmission cable.

6. The data transmitting apparatus as set forth in claim 1, further comprising:
   multiple channel serial digital video signal forming means to which a specific parallel digital video signal, which forms word string data configured with a specific frame rate, a quantifying bit number, and parallel arrangement of green color, blue color and red color original color signal data series, is supplied, to convert the specific parallel digital video signal into first serial digital video signals of n channels forming bit string data,
   wherein each of which has a bit rate defined by a standard, and said first serial digital video signals of n channels, which are obtained from the multiple channel serial digital video signal forming means, are supplied to said plurality of serial/parallel converting means.

7. A data transmitting apparatus comprising:
   a plurality of serial/parallel converting means to which first serial digital video signals of n channels, where n is an integer of 2 or more, forming bit string data, each of which has a bit rate defined by a standard, are supplied, to obtain first word string data of n channels forming a parallel digital video signal, each of which has a line portion data structure defined by a standard;

a plurality of 8 bit/10 bit converting means to which the first word string data of n channels, which is obtained from the plurality of serial/parallel converting means, is supplied, to apply 8 bit/10 bit converting processing to each of the first word string data of n channels by a first predetermined bit number at a time, and to form second word string data of n channels, each of which has a predetermined word bit number;

data multiplexing means which multiplexes the second word string data of n channels which is obtained from the plurality of 8 bit/10 bit converting means, to form multiplex word string data;

multiple channel data forming means which takes out the multiplex word string data which is obtained from the data multiplexing means, by a second predetermined bit number at a time, to form bit string data of m channels, where m is an integer which is larger than n, each of which has a predetermine bit rate;

data multiplexing and parallel/serial converting means which multiplexes bit string data of in channels, which is obtained from the multiple channel data forming means and applies parallel/serial conversion thereto, to form bit string data in which a data rate is 10 Gb/s or more, as a second serial/digital video signal; and data sending away means which sends away to transmit bit string data which is obtained from the data multiplexing and parallel/serial converting means and in which a data rate is 10 Gb/s or more, wherein provided are n pieces of serial digital video signal forming means, to which third serial digital video signals of p channels, where p is an integer of 2 or more, forming bit string data, each of which has a lower bit rate defined by a standard than a bit rate of said first serial digital video signal, are supplied, to form a first serial digital video signal of one channel based on the third serial digital signals of p channels, and said first serial digital video signals of n channels, which are obtained from the n pieces of serial digital video signal forming means, respectively, are supplied to said plurality of serial/parallel converting means.

8. A data transmitting apparatus comprising:

a plurality of serial/parallel converting means to which first serial digital video signals of n channels, where n is an integer of 2 or more, forming bit string data, each of which has a bit rate defined by a standard, are supplied, to obtain first word string data of n channels forming a parallel digital video signal, each of which has a line portion data structure defined by a standard;

a plurality of 8 bit/10 bit converting means to which the first word string data of n channels, which is obtained from the plurality of serial/parallel, converting means, is supplied, to apply 8 bit/10 bit converting processing to each of the first word string data of n channels by a first predetermined bit number at a time, and to form second word string data of n channels, each of which has a predetermined word bit number;

data multiplexing means which multiplexes the second word string data of n channels which is obtained from the plurality of 8 bit/10 bit converting means, to form multiplex word string data;

multiple channel data forming means which takes out the multiplex word string data which is obtained from the data multiplexing means, by a second predetermined bit number at a time, to form bit string data of m channels, where m is an integer which is larger than n, each of which has a predetermine bit rate;

data multiplexing and parallel/serial converting means which multiplexes bit string data of m channels, which is obtained from the multiple channel data forming means and also applies parallel/serial conversion thereto, to form bit string data in which a data rate is 10 Gb/s or more, as a second serial/digital video signal; and data sending away means which sends away to transmit bit string data which is obtained from the data multiplexing and parallel/serial converting means and in which a data rate is 10 Gb/s or more, wherein provided are q pieces, where q is an integer which is smaller than n, of serial digital video signal forming means to which third serial digital video signals of p channels, where p is an integer of 2 or more, forming bit string data, each of which has a lower bit rate defined by a standard than a bit rate of said first serial digital video signal, to form a first serial digital video signal of one channel based on the third serial digital video signals of p channels, and said first serial digital video signals of q channels, which are obtained from the q pieces of serial digital video forming means, respectively, and the first serial digital video signals of (n−q) channels are supplied to said plurality of serial/parallel converting means as first serial digital video signals of n channels.

9. A data transmitting apparatus comprising:

a plurality of serial/parallel converting means to which first serial digital video signals of n channels, where n is an integer of 2 or more, forming bit string data, each of which has a bit rate defined by a standard, are supplied, to obtain first word string data of n channels forming a parallel digital video signal, each of which has a line portion data structure defined by a standard;

a plurality of 8 bit/10 bit converting means to which the first word string data of n channels, which is obtained from the plurality of serial/parallel converting means, is supplied, to apply 8 bit/10 bit converting processing to each of the first word string data of n channels by a first predetermined bit number at a time, and to form second word string data of n channels, each of which has a predetermined word bit number;

data multiplexing means which multiplexes the second word string data of n channels which is obtained from the plurality of 8 bit/10 bit converting means, to form multiplex word string data;

multiple channel data forming means which takes out the multiplex word string data which is obtained from the data multiplexing means, by a second predetermined bit number at a time, to form bit string data of m channels, where m is an integer which is larger than n, each of which has a predetermine bit rate;

data multiplexing and parallel/serial converting means which multiplexes bit string data of m channels, which is obtained from the multiple channel data forming means and also applies parallel/serial conversion thereto, to form, bit string data in which a data rate is 10 Gb/s or more, as a second serial/digital video signal; and data sending away means which sends away to transmit bit string data which is obtained from the data multiplexing and parallel/serial converting means and in which a data rate is 10 Gb/s or more, wherein provided are q pieces, where q is an integer which is smaller than n, of serial digital video signal forming means to which third serial digital video signals of p channels, where p is an integer of 2 or more, forming bit string data, each of which has a lower bit rate defined by a standard than a bit rate of said first serial digital video signal, to form a first serial digital video signal of one channel based on the third serial digital video signals of p channels, and said first serial digital video signals of q channels, which are obtained from the q pieces of serial digital video forming means, respectively, and the first serial digital video signals of (n−q) channels are supplied to said plurality of serial/parallel converting means as first serial digital video signals of n channels, wherein provided is one piece of a serial digital video forming means which forms a first serial digital video signal of one channel based on said third serial digital video signals of p channels, and the first serial digital video signal of one channel, which is obtained from one piece of the serial digital video signal forming means, and first serial digital video signals of (n−1) channels are supplied to said plurality of serial/parallel converting means as first serial digital video signals of n channels.

10. A data transmitting apparatus comprising:

a plurality of serial/parallel converting means to which first serial digital video signals of n channels, where n is an integer of 2 or more, forming bit string data, each of which has a bit rate defined by a standard, are supplied, to obtain first word string data of n channels forming a parallel digital video signal, each of which has a line portion data structure defined by a standard;

a plurality of 8 bit/10 bit converting means to which the first word string data of n channels, which is obtained from the plurality of serial/parallel converting means, is supplied, to apply 8 bit/10 bit converting processing to each of the first word string data of n channels by a first predetermined bit number at a time, and to form second word string data of n channels, each of which has a predetermined word bit number;

data multiplexing means which multiplexes the second word string data of n channels which is obtained from the plurality of 8 bit/10 bit converting means, to form multiplex word string data:

multiple channel data forming means which takes out the multiplex word string data which is obtained from the data multiplexing means, by a second predetermined bit number at a time, to form bit string data of m channels, where m is an integer which is larger than n, each of which has a predetermine bit rate:

data multiplexing and parallel/serial converting means which multiplexes bit string data of m channels, which is obtained from the multiple channel data forming means and also applies parallel/serial conversion thereto, to form bit string data in which, a data rate is 10 Gb/s or more, as a second serial/digital video signal; and data sending away means which sends away to transmit bit string data which is obtained from the data multiplexing and parallel/serial converting means and in which a data rate is 10 Gb/s or more, wherein provided are q pieces, where q is an integer which is smaller than n, of serial digital video signal forming means to which third serial digital video signals of p channels, where p is an integer of 2 or more, forming bit string data, each of which has a lower bit rate defined by a standard than a bit rate of said first serial digital video signal, to form a first serial digital video signal of one channel based on the third serial digital video signals of p channels, and said first serial digital video signals of q channels, which are obtained from the q pieces of serial digital video forming means, respectively, and the first serial digital video signals of (n−q) channels are supplied to said plurality of serial/parallel converting means as first serial digital video signals of n channels, wherein provided are q pieces here q is an integer which is smaller than n, of serial digital video signal forming means which forms a first serial digital video signal of one channel based on said third serial digital video signals of p channels, and the first serial digital video signals of q channels, which are obtained from the q pieces of serial digital video signal forming means, respectively, and the first serial digital video signal of one channel are supplied to said plurality of serial/parallel converting means as first serial digital video signals of n channels.

11. A data transmitting apparatus comprising:

a plurality of serial/parallel converting sections to which first serial digital video signals of n channels, where n is an integer of 2 or more, forming bit string data, each of which has a bit rate defined by a standard, are supplied, to obtain first word string data of n channels forming a parallel digital video signal, each of which has a line portion data structure defined by a standard;

a plurality of 8 bit/10 bit converting sections to which the first word string data of n channels, which is obtained from the plurality of serial/parallel converting sections, is supplied, to apply 8 bit/10 bit converting processing to each of the first word string data of n channels by a first predetermined bit number at a time, and to form second word string data of n channels, each of which has a predetermined word bit number;

a data multiplexing section which multiplexes the second word string data of n channels which is obtained from the plurality of 8 bit/10 bit converting sections, to form multiplex word string data;

a data length converting section for converting the formed multiplex word string data to a sequential data string having additional data utilized for speed adjustment;

a multiple channel data forming section which takes out the converted multiplex word string data which is obtained from the data multiplexing section, by a second predetermined bit number at a time, to form bit string data of m channels, where m is an integer which is larger than n, each of which has a predetermine bit rate;

a data multiplexing and parallel/serial converting section which multiplexes bit string data of m channels, which is obtained from the multiple channel data forming section and also applies parallel/serial conversion thereto, to form bit string data in which a data rate is 10 Gb/s or more, as a second serial/digital video signal; and data sending away section which sends away to transmit bit string data which is obtained from the data multiplexing and parallel/serial converting section and in which a data rate is 10 Gb/s or more.

* * * * *